(12) United States Patent  
Matsumoto et al.

(10) Patent No.: US 6,590,608 B2  
(45) Date of Patent: Jul. 8, 2003

(54) METHOD AND APPARATUS FOR MANAGING A PLURALITY OF IMAGES BY CLASSIFYING THEM INTO GROUPS

(75) Inventors: Kiyoshi Matsumoto, Kokubunji (JP); Yuichi Yagawa, Chigasaki (JP); Kazuto Senda, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/803,674

(22) Filed: Mar. 12, 2001

(65) Prior Publication Data

US 2001/0028394 A1 Oct. 11, 2001

Related U.S. Application Data

(63) Continuation of application No. 09/135,996, filed on Aug. 18, 1998, now Pat. No. 6,229,566, which is a continuation of application No. 08/325,095, filed on Oct. 17, 1994, now Pat. No. 5,796,428.

(30) Foreign Application Priority Data

Oct. 21, 1993 (JP) .............................................. 5-263354

(51) Int. Cl.⁷ ................................................ H04N 5/76
(52) U.S. Cl. ................................ 348/231.2; 348/231.3; 348/231.5
(58) Field of Search ................................ 348/722, 552, 348/231, 232, 233, 74, 75, 333, 231.2, 231.3, 231.4, 231.5, 231.6, 714, 716, 718; 345/723; 386/4, 35, 54, 55

(56) References Cited

U.S. PATENT DOCUMENTS

| 4,531,161 A | 7/1985 | Murakoshi |
| 4,602,296 A | 7/1986 | Murakoshi |
| 4,717,971 A | 1/1988 | Sawyer |
| 4,888,648 A | 12/1989 | Takeuchi et al. |
| 4,943,866 A | 7/1990 | Barker et al. |
| 4,982,291 A | 1/1991 | Kurahashi et al. |
| 4,996,714 A | 2/1991 | Desjardins et al. |
| 5,012,334 A | 4/1991 | Etra |
| 5,043,816 A | 8/1991 | Nakano et al. |
| 5,133,048 A | 7/1992 | Parsons et al. |
| 5,138,459 A | 8/1992 | Roberts et al. |
| 5,146,353 A | 9/1992 | Isoguchi et al. |
| 5,157,511 A | 10/1992 | Kawai et al. |

(List continued on next page.)

FOREIGN PATENT DOCUMENTS

| JP | 58-182976 | 10/1983 |
| JP | 59-123386 | 7/1984 |
| JP | 3261935 | 11/1991 |
| JP | 5-137053 | 6/1993 |
| JP | 6110107 | 4/1994 |
| JP | 6-153143 | 5/1994 |
| JP | 7-75048 | 3/1995 |

OTHER PUBLICATIONS

Prasad et al., "A Microcomputer–Based Image Database Management System", IEEE Transactions, vol., IE–34, No. 1, Feb. 1987, pp. 83–88.

*Primary Examiner*—Victor R. Kostak
(74) *Attorney, Agent, or Firm*—Antonelli, Terry, Stout & Kraus, LLP

(57) ABSTRACT

An electronic photography system which displays an image shot by an electronic image capturing unit. The electronic image capturing unit includes an optical path, an image pickup for converting a focused image to electronic image data, an information inputting device for adding attribute data to the image data, and a storage for storing the image data and attribute data in mutually associated relationship. The system further includes the unit for classifying the image data on the basis of the attribute data for grouping the image data into album groups, and selecting, the album group to display the image data included in the selected album.

19 Claims, 46 Drawing Sheets

U.S. PATENT DOCUMENTS

| | | |
|---|---|---|
| 5,162,915 A | 11/1992 | Idera et al. |
| 5,231,501 A | 7/1993 | Sakai |
| 5,270,831 A | 12/1993 | Parulski et al. |
| 5,295,077 A | 3/1994 | Fukuoka |
| 5,363,203 A | 11/1994 | Tahara et al. |
| 5,402,171 A | 3/1995 | Tagami et al. |
| 5,412,773 A | 5/1995 | Carlucci et al. |
| 5,438,359 A | 8/1995 | Aoki |
| 5,440,401 A | 8/1995 | Parulski et al. |
| 5,448,550 A | 9/1995 | Mok et al. |
| 5,481,296 A | 1/1996 | Cragun et al. |
| 5,493,315 A | 2/1996 | Atchley |
| 5,600,844 A | 2/1997 | Shaw et al. |
| 5,796,424 A | 8/1998 | Ely et al. |
| 5,796,429 A | 8/1998 | Suzuki et al. |
| 5,806,072 A | 9/1998 | Kuba et al. |

FIG. 12

| PICTURE NUMBER | YEAR | MONTH | DAY | TIME |
|---|---|---|---|---|
| 01 | 92 | 12 | 21 | 1344 |
| 02 | 92 | 12 | 24 | 2132 |
| 03 | 92 | 12 | 24 | 2150 |
| 04 | 92 | 12 | 24 | 2210 |
| 05 | 92 | 12 | 25 | 0753 |
| 06 | 92 | 12 | 28 | 0926 |
| 07 | 93 | 01 | 01 | 0534 |
| 08 | 93 | 01 | 01 | 0627 |
| 09 | 93 | 01 | 01 | 1009 |
| 10 | 93 | 01 | 01 | 1013 |
| 11 | 93 | 01 | 02 | 1326 |
| 12 | 93 | 01 | 02 | 1342 |
| 13 | 93 | 01 | 02 | 1447 |
| 14 | 93 | 01 | 13 | 1022 |
| 15 | 93 | 01 | 13 | 1635 |
| 16 | 93 | 01 | 13 | 1922 |
| 17 | 93 | 01 | 14 | 0855 |
| 18 | 93 | 01 | 14 | 1042 |
| 19 | 93 | 01 | 14 | 1155 |
| 20 | 93 | 01 | 14 | 1331 |
| 21 | 93 | 01 | 14 | 1911 |
| 22 | 93 | 01 | 14 | 2033 |
| 23 | 93 | 01 | 15 | 1125 |
| 24 | 93 | 01 | 15 | 1356 |
| 25 | 93 | 02 | 05 | 1013 |
| 26 | 93 | 02 | 06 | 0832 |

FIG. 14

| FILM NUMBER | TOTAL PICTURE NUMBER | YEAR | MONTH | DAY |
|---|---|---|---|---|
| 01 | 56 | 92 | 04 | 12 |
| 02 | 329 | 92 | 07 | 28 |
| 03 | 145 | 92 | 08 | 10 |
| 04 | 51 | 92 | 08 | 18 |
| 05 | 238 | 92 | 10 | 25 |
| 06 | 32 | 92 | 12 | 02 |
| 07 | 26 | 93 | 02 | 06 |
| 08 | 170 | 93 | 03 | 15 |
| 09 | 261 | 93 | 05 | 08 |
| 10 | 82 | 93 | 06 | 30 |

FIG. 16

| ALBUM HEADER | | | | | | |
|---|---|---|---|---|---|---|
| ALBUM NUMBER | ALBUM NAME | TOTAL PAGE NUMBER | VERTICAL PAGE WIDTH | HORIZONTAL PAGE WIDTH | FRONT COVER COLOR | FRONT COVER PATTERN |
| 1601 | 1602 | 1603 | 1604 | 1605 | 1606 | 1607 |

| FRAME NUMBER | FILM NUMBER | PICTURE NUMBER | TRIMMING START X POSITION | TRIMMING START Y POSITION | TRIMMING WIDTH (W) |
|---|---|---|---|---|---|
| 1801 | 1802 | 1803 | 1804 | 1805 | 1806 |

| TRIMMING HIGHT (H) | SCALING FACTOR | ROTATIONAL ANGLE | DISPLAY X POSITION | DISPLAY Y POSITION |
|---|---|---|---|---|
| 1807 | 1808 | 1809 | 1810 | 1811 |

PICTURE LIST — 1702

FIG. 21

| PAGE NUMBER | FRAME NUMBER | FILM NUMBER | PICTURE NUMBER | TRIMMING START X POSITION | TRIMMING START Y POSITION | TRIMMING WIDTH (W) | TRIMMING HEIGHT (H) | SCALING FACTOR | ROTATIONAL ANGLE | DISPLAY X POSITION | DISPLAY Y POSITION |
|---|---|---|---|---|---|---|---|---|---|---|---|
| 1 | 1 | 07 | 14 | 0 | 0 | 720 | 480 | 25 | 0 | 110 | 120 |
| 1 | 2 | 07 | 15 | 0 | 0 | 720 | 480 | 25 | 0 | 310 | 120 |
| 1 | 3 | 07 | 16 | 0 | 0 | 720 | 480 | 25 | 0 | 110 | 380 |
| 2 | 1 | 07 | 17 | 0 | 0 | 720 | 480 | 25 | 0 | 110 | 120 |
| 2 | 2 | 07 | 18 | 0 | 0 | 720 | 480 | 25 | 0 | 310 | 120 |
| 2 | 3 | 07 | 19 | 0 | 0 | 720 | 480 | 25 | 0 | 110 | 380 |
| 2 | 4 | 07 | 20 | 0 | 0 | 720 | 480 | 25 | 0 | 310 | 380 |
| 3 | 1 | 07 | 21 | 0 | 0 | 720 | 480 | 25 | 0 | 110 | 120 |
| 3 | 2 | 07 | 22 | 0 | 0 | 720 | 480 | 25 | 0 | 310 | 120 |
| 4 | 1 | 07 | 23 | 0 | 0 | 720 | 480 | 25 | 0 | 110 | 120 |
| 4 | 2 | 07 | 24 | 0 | 0 | 720 | 480 | 25 | 0 | 310 | 120 |

FIG. 22

| PAGE NUMBER | PAGE ATTRIBUTE | LAYOUT SHEET COLOR |
|---|---|---|
| 1 | 93.01.13 | WHITE |
| 2 | 93.01.14 | WHITE |
| 3 | 93.01.14 | WHITE |
| 4 | 93.01.15 | WHITE |

FIG. 23

| ALBUM NUMBER | ALBUM NAME | TOTAL PAGE NUMBER | VERTICAL PAGE WIDTH | HORIZONTAL PAGE WIDTH | FRONT COVER COLOR | FRONT COVER PATTERN |
|---|---|---|---|---|---|---|
| 5 | EUROPE TRIP | 4 | 520 | 420 | BLUE | VERTICAL PATTERN |

FIG. 28

| PICTURE NUMBER | SHOOTING YEAR | SHOOTING MONTH | SHOOTING DAY | SHOOTING TIME | SHOOTING ATTITUDE |
|---|---|---|---|---|---|
| 01 | 92 | 12 | 21 | 1344 | 0 |
| 02 | 92 | 12 | 24 | 2132 | 0 |
| 03 | 92 | 12 | 24 | 2150 | 0 |
| 04 | 92 | 12 | 24 | 2210 | 90 |
| 05 | 92 | 12 | 25 | 0753 | 0 |
| 06 | 92 | 12 | 28 | 0926 | 0 |
| 07 | 93 | 01 | 01 | 0534 | 0 |
| 08 | 93 | 01 | 01 | 0627 | 90 |
| 09 | 93 | 01 | 01 | 1009 | 0 |
| 10 | 93 | 01 | 01 | 1013 | 0 |
| 11 | 93 | 01 | 02 | 1326 | 0 |
| 12 | 93 | 01 | 02 | 1342 | 0 |
| 13 | 93 | 01 | 02 | 1447 | 0 |
| 14 | 93 | 01 | 13 | 1022 | 0 |
| 15 | 93 | 01 | 13 | 1635 | 270 |
| 16 | 93 | 01 | 13 | 1922 | 0 |
| 17 | 93 | 01 | 14 | 0855 | 0 |
| 18 | 93 | 01 | 14 | 1042 | 0 |
| 19 | 93 | 01 | 14 | 1155 | 90 |
| 20 | 93 | 01 | 14 | 1331 | 0 |
| 21 | 93 | 01 | 14 | 1911 | 90 |
| 22 | 93 | 01 | 14 | 2033 | 0 |
| 23 | 93 | 01 | 15 | 1125 | 0 |
| 24 | 93 | 01 | 15 | 1356 | 0 |
| 25 | 93 | 02 | 05 | 1013 | 0 |
| 26 | 93 | 02 | 06 | 0832 | 0 |

| PAGE NUMBER | FRAME NUMBER | FILM NUMBER | PICTURE NUMBER | TRIMMING START X POSITION | TRIMMING START Y POSITION | TRIMMING WIDTH (W) | TRIMMING HEIGHT (H) | SCALING FACTOR | ROTATIONAL ANGLE | DISPLAY X POSITION | DISPLAY Y POSITION |
|---|---|---|---|---|---|---|---|---|---|---|---|
| 1 | 1 | 12 | 14 | 0 | 0 | 720 | 480 | 25 | 0 | 110 | 120 |
| 1 | 2 | 12 | 15 | 0 | 0 | 720 | 480 | 25 | 270 | 310 | 120 |
| 1 | 3 | 12 | 16 | 0 | 0 | 720 | 480 | 25 | 0 | 110 | 380 |
| 2 | 1 | 12 | 17 | 0 | 0 | 720 | 480 | 25 | 0 | 110 | 120 |
| 2 | 2 | 12 | 18 | 0 | 0 | 720 | 480 | 25 | 0 | 310 | 120 |
| 2 | 3 | 12 | 19 | 0 | 0 | 720 | 480 | 25 | 90 | 110 | 380 |
| 2 | 4 | 12 | 20 | 0 | 0 | 720 | 480 | 25 | 0 | 310 | 380 |
| 3 | 1 | 12 | 21 | 0 | 0 | 720 | 480 | 25 | 90 | 110 | 120 |
| 3 | 2 | 12 | 22 | 0 | 0 | 720 | 480 | 25 | 0 | 310 | 120 |
| 4 | 1 | 12 | 23 | 0 | 0 | 720 | 480 | 25 | 0 | 110 | 120 |
| 4 | 2 | 12 | 24 | 0 | 0 | 720 | 480 | 25 | 0 | 310 | 120 |

| PICTURE NUMBER | YEAR | MONTH | DAY | TIME | SHOOTING PLACE |
|---|---|---|---|---|---|
| 01 | 92 | 12 | 21 | 1344 | (7) |
| 02 | 92 | 12 | 24 | 2132 | (8) |
| 03 | 92 | 12 | 24 | 2150 | (9) |
| 04 | 92 | 12 | 24 | 2210 | (10) |
| 05 | 92 | 12 | 25 | 0753 | (11) |
| 06 | 92 | 12 | 28 | 0926 | (12) |
| 07 | 93 | 01 | 01 | 0534 | (13) |
| 08 | 93 | 01 | 01 | 0627 | (14) |
| 09 | 93 | 01 | 01 | 1009 | (15) |
| 10 | 93 | 01 | 01 | 1013 | (16) |
| 11 | 93 | 01 | 02 | 1326 | (17) |
| 12 | 93 | 01 | 02 | 1342 | (18) |
| 13 | 93 | 01 | 02 | 1447 | (19) |
| 14 | 93 | 01 | 13 | 1022 | (20) |
| 15 | 93 | 01 | 13 | 1635 | (21) |
| 16 | 93 | 01 | 13 | 1922 | (22) |
| 17 | 93 | 01 | 14 | 0855 | (23) |
| 18 | 93 | 01 | 14 | 1042 | (24) |
| 19 | 93 | 01 | 14 | 1155 | (25) |
| 20 | 93 | 01 | 14 | 1331 | (26) |
| 21 | 93 | 01 | 14 | 1911 | (27) |
| 22 | 93 | 01 | 14 | 2033 | (28) |
| 23 | 93 | 01 | 15 | 1125 | (29) |
| 24 | 93 | 01 | 15 | 1356 | (30) |
| 25 | 93 | 02 | 05 | 1013 | (31) |
| 26 | 93 | 02 | 06 | 0832 | (32) |

FIG. 34

| PAGE NUMBER | FRAME NUMBER | FILM NUMBER | PICTURE NUMBER | TRIMMING START X POSITION | TRIMMING START Y POSITION | TRIMMING WIDTH (W) | TRIMMING HEIGHT (H) | SCALING FACTOR | ROTATIONAL ANGLE | DISPLAY X POSITION | DISPLAY Y POSITION |
|---|---|---|---|---|---|---|---|---|---|---|---|
| 1 | 1 | 12 | 01 | 0 | 0 | 720 | 480 | 25 | 0 | 110 | 120 |
| 1 | 2 | 12 | 07 | 0 | 0 | 720 | 480 | 25 | 0 | 310 | 120 |
| 1 | 3 | 12 | 08 | 0 | 0 | 720 | 480 | 25 | 0 | 110 | 380 |
| 1 | 4 | 12 | 09 | 0 | 0 | 720 | 480 | 25 | 0 | 310 | 380 |
| 2 | 1 | 12 | 10 | 0 | 0 | 720 | 480 | 25 | 0 | 110 | 120 |
| 2 | 2 | 12 | 25 | 0 | 0 | 720 | 480 | 25 | 0 | 310 | 120 |

| PICTURE NUMBER | YEAR | MONTH | DAY | TIME | PHOTOGRAPHER |
|---|---|---|---|---|---|
| 01 | 92 | 12 | 21 | 1344 | (7) |
| 02 | 92 | 12 | 24 | 2132 | (8) |
| 03 | 92 | 12 | 24 | 2150 | (9) |
| 04 | 92 | 12 | 24 | 2210 | (10) |
| 05 | 92 | 12 | 25 | 0753 | (11) |
| 06 | 92 | 12 | 28 | 0926 | (12) |
| 07 | 93 | 01 | 01 | 0534 | (13) |
| 08 | 93 | 01 | 01 | 0627 | (14) |
| 09 | 93 | 01 | 01 | 1009 | (15) |
| 10 | 93 | 01 | 01 | 1013 | (16) |
| 11 | 93 | 01 | 02 | 1326 | (17) |
| 12 | 93 | 01 | 02 | 1342 | (18) |
| 13 | 93 | 01 | 02 | 1447 | (19) |
| 14 | 93 | 01 | 13 | 1022 | (20) |
| 15 | 93 | 01 | 13 | 1635 | (21) |
| 16 | 93 | 01 | 13 | 1922 | (22) |
| 17 | 93 | 01 | 14 | 0855 | (23) |
| 18 | 93 | 01 | 14 | 1042 | (24) |
| 19 | 93 | 01 | 14 | 1155 | (25) |
| 20 | 93 | 01 | 14 | 1331 | (26) |
| 21 | 93 | 01 | 14 | 1911 | (27) |
| 22 | 93 | 01 | 14 | 2033 | (28) |
| 23 | 93 | 01 | 15 | 1125 | (29) |
| 24 | 93 | 01 | 15 | 1356 | (30) |
| 25 | 93 | 02 | 05 | 1013 | (31) |
| 26 | 93 | 02 | 06 | 0832 | (32) |

FIG. 38

| PAGE NUMBER | FRAME NUMBER | FILM NUMBER | PICTURE NUMBER | TRIMMING START X POSITION | TRIMMING START Y POSITION | TRIMMING WIDTH (W) | TRIMMING HEIGHT (H) | SCALING FACTOR | ROTATIONAL ANGLE | DISPLAY X POSITION | DISPLAY Y POSITION |
|---|---|---|---|---|---|---|---|---|---|---|---|
| 1 | 1 | 12 | 02 | 0 | 0 | 720 | 480 | 25 | 0 | 110 | 120 |
| 1 | 2 | 12 | 03 | 0 | 0 | 720 | 480 | 25 | 0 | 310 | 120 |
| 1 | 3 | 12 | 04 | 0 | 0 | 720 | 480 | 25 | 0 | 110 | 380 |
| 1 | 4 | 12 | 07 | 0 | 0 | 720 | 480 | 25 | 0 | 310 | 380 |
| 2 | 1 | 12 | 08 | 0 | 0 | 720 | 480 | 25 | 0 | 110 | 120 |
| 2 | 2 | 12 | 14 | 0 | 0 | 720 | 480 | 25 | 0 | 310 | 120 |
| 2 | 3 | 12 | 26 | 0 | 0 | 720 | 480 | 25 | 0 | 110 | 380 |

FIG. 43

| PAGE NUMBER | FRAME NUMBER | FILM NUMBER | PICTURE NUMBER | TRIMMING START X POSITION | TRIMMING START Y POSITION | TRIMMING WIDTH (W) | TRIMMING HEIGHT (H) | SCALING FACTOR | ROTATIONAL ANGLE | DISPLAY X POSITION | DISPLAY Y POSITION | DISPLAY NUMBER |
|---|---|---|---|---|---|---|---|---|---|---|---|---|
| 1 | 1 | 12 | 14 | 0 | 0 | 720 | 480 | 25 | 0 | 110 | 120 | 0 |
| 1 | 2 | 12 | 15 | 0 | 0 | 720 | 480 | 25 | 0 | 310 | 120 | 0 |
| 1 | 3 | 12 | 16 | 0 | 0 | 720 | 480 | 25 | 0 | 110 | 380 | -1 |
| 2 | 1 | 12 | 17 | 0 | 0 | 720 | 480 | 25 | 0 | 110 | 120 | 0 |
| 2 | 2 | 12 | 18 | 0 | 0 | 720 | 480 | 25 | 0 | 310 | 120 | 0 |
| 2 | 3 | 12 | 19 | 0 | 0 | 720 | 480 | 25 | 0 | 110 | 380 | +2 |
| 2 | 4 | 12 | 20 | 0 | 0 | 720 | 480 | 25 | 0 | 310 | 380 | 0 |
| 3 | 1 | 12 | 21 | 0 | 0 | 720 | 480 | 25 | 0 | 110 | 120 | 0 |
| 3 | 2 | 12 | 22 | 0 | 0 | 720 | 480 | 25 | 0 | 310 | 120 | +1 |
| 4 | 1 | 12 | 23 | 0 | 0 | 720 | 480 | 25 | 0 | 110 | 120 | 0 |
| 4 | 2 | 12 | 24 | 0 | 0 | 720 | 480 | 25 | 0 | 310 | 120 | 0 |

| PAGE NUMBER | FRAME NUMBER | FILM NUMBER | PICTURE NUMBER | TRIMMING START X POSITION | TRIMMING START Y POSITION | TRIMMING WIDTH (W) | TRIMMING HEIGHT (H) | SCALING FACTOR | ROTATION-AL ANGLE | DISPLAY X POSITION | DISPLAY Y POSITION | VOICE DATA |
|---|---|---|---|---|---|---|---|---|---|---|---|---|
| 1 | 1 | 12 | 14 | 0 | 0 | 720 | 480 | 25 | 0 | 110 | 120 | 1 |
| 1 | 2 | 12 | 15 | 0 | 0 | 720 | 480 | 25 | 0 | 310 | 120 | 0 |
| 1 | 3 | 12 | 16 | 0 | 0 | 720 | 480 | 25 | 0 | 110 | 380 | 1 |
| 2 | 1 | 12 | 17 | 0 | 0 | 720 | 480 | 25 | 0 | 110 | 120 | 0 |
| 2 | 2 | 12 | 18 | 0 | 0 | 720 | 480 | 25 | 0 | 310 | 120 | 0 |
| 2 | 3 | 12 | 19 | 0 | 0 | 720 | 480 | 25 | 0 | 110 | 380 | 1 |
| 2 | 4 | 12 | 20 | 0 | 0 | 720 | 480 | 25 | 0 | 310 | 380 | 0 |
| 3 | 1 | 12 | 21 | 0 | 0 | 720 | 480 | 25 | 0 | 110 | 120 | 1 |
| 3 | 2 | 12 | 22 | 0 | 0 | 720 | 480 | 25 | 0 | 310 | 120 | 1 |
| 4 | 1 | 12 | 23 | 0 | 0 | 720 | 480 | 25 | 0 | 110 | 120 | 0 |
| 4 | 2 | 12 | 24 | 0 | 0 | 720 | 480 | 25 | 0 | 310 | 120 | 1 |

4701

METHOD AND APPARATUS FOR MANAGING A PLURALITY OF IMAGES BY CLASSIFYING THEM INTO GROUPS

CROSS-REFERENCE TO EARLIER-FILED APPLICATIONS

This application is a continuation of earlier-filed application Ser. No. 09/135,996 filed Aug. 18, 1998 and issued May 8, 2001 as U.S. Pat. No. 6,229,566, which is a continuation of Ser. No. 08/325,095 filed Oct. 17, 1994 and issued Aug. 18, 1998 as U.S. Pat. No. 5,796,428.

BACKGROUND OF THE INVENTION

The present invention relates to a so-called electronic photography system which can electronically record images on such a memory device as a semiconductor memory or a magnetic disk without using any films.

Silver halide film is usually used for photograph. The exposures are developed and printed on a photographic paper for its appreciation. There exists a technique for displaying images printed on a photographic paper on a TV display. For example, disclosed in JP-A-3-261935 is a system in which picture images printed on a photographic paper are displayed on a monitor device together with information associated with the picture images, such as shooting days and shutter speeds.

Meanwhile, an electronic still image capturing unit has been put in practical use in these years. This image capturing unit is designed to electronically record picture images on a memory device such as a semiconductor memory or a magnetic disk without using any films. In a reproduction mode of the image capturing unit, the recorded picture images can be reproduced on an external TV display or can be transferred to a computer to be used for desk-top publishing (DTP).

Photographs for use by a single individual have been rapidly increased lately. Typically, pictures taken by an individual amount to several tens a year. Thus, several hundreds of pictures are produced in a family. In particular, a newly-wedded couple, a family having a newly born baby or a person who goes abroad, has many chances of taking pictures and thus the number of pictures taken per year amounts nearly to 500.

It is highly troublesome to re-arrange and keep these pictures, which results in may cases in that such pictures are merely inserted into a pocket-type album or kept in different places. For this reason, even when it is desired to find some pictures, such finding is difficult. In addition, when pictures are kept in different places, such pictures tend to be lost undesirably.

For the purpose of re-arranging and keeping pictures, in general, there is used such an album of a type that pictures are bonded on layout sheets. In this case, it is also possible to divide the pictures according to the theme or subject matter or to add some comments to them. However, rearranging and keeping pictures requires a lot of labors, including classifying and rearranging the pictures and arranging the pictures on layout sheets in a beautiful and balanced layout. Further, such comments as associated dates and places are added to the pictures. When an user after taking pictures immediately conducts the above works, the works might not impose so burdensome feeling on the user. However, once such pictures are left alone and accumulated as not rearranged, it becomes troublesome to rearrange them. And such pictures contain many pictures which are not taken well, that is, out of focus or have improper exposure.

It is an object of the present invention to provide an image recording/reproducing system which can eliminate the above problems in the prior art and can easily rearrange and keep photographic images and also can display the images for appreciation.

SUMMARY OF THE INVENTION

In order to solve the above problems, in accordance with the present invention, there is provided an image recording/reproducing system which comprises an image capturing unit, an image storage/display unit and means for applying attribute data to data of a picture image at the time of shooting the picture image is provided in the image capturing unit. Further, means for displaying the picture image on the basis of the attribute data in a picture display mode is provided in the image storage/display unit. The image capturing unit is based on such a system that a device such as a charge coupled device (CCD) is employed in place of silver halide film to capture the image data in the image capturing unit in the form of electronic data. Since the attribute data is made also in the form of electronic data, the image and attribute data can be systematically handled. The image storage/display unit includes a data storage for storing the image data therein and an image display for electronically displaying the image data in the form of an album thereon.

In accordance with first one of preferable aspects of the present invention, means for applying a date and a time of capturing the image data to the picture image data as the attribute data is provided in the image capturing unit. Further, the image storage/display unit classifies and displays the image data on the basis of this attribute data.

In accordance with second one of the preferable aspects of the present invention, an attitude detector for detecting an attitude of an image pickup is provided in the image capturing unit, and means for applying as attribute data to the image data the attitude of the image pickup at the time of capturing the image data is also provided in the image capturing unit. Further, the image storage/display unit changes an orientation of the image data to be displayed on the basis of the attitude attribute data.

In accordance with third one of the preferable aspects of the present invention, a shooting place input part is provided in the image capturing unit, and means for applying the picture shooting place to the picture image data as attribute data is also provided in the image capturing unit. Further, the image storage/display unit classifies and displays the image data on the basis of the shooting place attribute data.

In accordance with fourth one of the preferable aspects of the present invention, a image input part for inputting an image of the operator of the system is provided in the image capturing unit, and means for appending the image of the operator to the picture image data as an operator attribute data is also provided in the image capturing unit. Further, the image storage/display unit classifies and displays the image data on the basis of the attribute data.

In accordance with fifth one of the preferable aspects of the present invention, means for shooting sub picture images at times in the vicinity of the moment that a main picture image is shot and applying the sub picture image data to the main picture image data as attribute data of the main image data. Further, in the image storage/display unit, a desired image is selectively displayed among the main or sub picture image data.

In accordance with sixth one of the preferable aspects of the present invention, there is provided in the image capturing means for shooting sub images with shifted focuses at times in the vicinity of the moment of shooting a main picture image and applying the sub image data to the main picture image data as its attribute data. Further, in the image storage/display unit, a desired image is selectively displayed among the main or sub picture image data.

In accordance with seventh one of the preferable aspects of the present invention, there is provided in the image capturing means for shooting sub images with shifted apertures at times in the vicinity of the moment of shooting a main picture image and applying the sub image data to the main picture image data as its attribute data. Further, in the image storage/display unit, a desired image is selectively displayed among the main or sub picture image data.

In accordance with eighth one of the preferable aspects of the present invention, there is provided in the image capturing means for recording voice data of a shooting place at times in the vicinity of the moment of shooting a picture image and applying the voice data to the picture image data as its attribute data. Further, when it is desired to display the picture image data, the image storage/display unit reproduces the voice data of its attribute data.

At the time of shooting the picture image, the attribute data on the picture image is applied to the picture image data. These picture and attribute data are temporarily stored in the storage within the image capturing unit and then transferred to the image storage/display unit. In the image storage/display unit, the received picture and attribute data are once stored. Further, the image storage/display unit generates album data for classification and display on the basis of the attribute data. When it is desired to display the picture data, the data is classified and displayed in the form of an album on the basis of the attribute and album data. Further, when image display is desired, the display format is changed on the basis of the attribute data.

Upon arranging pictures, it is often that the pictures are classified according to themes such as, athletic meeting or travel abroad. However, as long as the pictures are treated by an individual, the pictures can be arranged on a time series basis. In other words, it is impossible to have such pictures of the same date on, e.g., athletic meeting and travel abroad. Accordingly, when the pictures are arranged in its shooting date or time order, the pictures can also be automatically classified according to themes.

In the first aspect of the invention, each time a picture image is shot, its date and time are previously recorded as attribute data. The image storage/display unit automatically classifies and displays the image data in the form of an album on the basis of the attribute data and album data generated based on the attribute data.

A picture image has vertical and horizontal orientations. Thus, when it is desired to display such pictures in the form of an album, the orientations of pictures must be aligned so that the pictures can be displayed in their erecting form.

In the second aspect of the invention, when a picture image is shot, an attitude of the image pickup is previously recorded as its attribute data. The image display displays such pictures thereon in such a manner that the pictures are automatically displayed in their erecting form.

Although picture classification has been carried out based on the date and time attribute data in the first aspect, it is also considered to classify such pictures on the basis of their shooting places.

In the third aspect, when a picture image is shot, its shooting place is previously recorded as its attribute data. The image storage/display unit automatically classifies and displays such pictures on the basis of the shooting place attribute data and album data generated based on the attribute data. For example, when it is desired to make an album of travel abroad, an entire album is produced in accordance with the first embodiment and pictures in the album are classified according to the shooting places, e.g., streets by means of the third embodiment.

In the case where pictures are taken by different members in a family and left mixed, albums for the individual photographers can be made. In the fourth aspect, when a picture image is shot, its photographer is previously recorded as its attribute data. The image storage/display unit automatically display such pictures in the form of each of the individual photographer albums on the basis of the attribute data and album data generated based on the attribute.

There often occurs such a case that some of persons as subjects close their eyes at the moment that the user depresses the shutter release, that is, missing of a good shutter-release timing. In the fifth aspect, sub picture images at times before and after the moment of the shutter release are stored and applied to the main picture image data of depression of the shutter release. When the main picture image taken at the moment of the shutter release is not acceptable, the image storage/display unit selects suitable one from the sub picture images and records in the album data indicative of the selection of the sub picture image in place of the main one. Thus, in the next display, the suitable sub picture image is displayed based on the album data.

Some of pictures are sometimes taken with improper focus. In the sixth aspect, after a main picture is taken, sub picture images are taken with focuses shifted from the focus of the main picture image and added to the main picture image data as its attribute data. When the main picture image is taken with improper focus, the image storage/display unit selects suitable one of the sub picture images with focuses shifted and records data indicative of the selection of the suitable sub picture image in the album data in place of the main picture image. Thus, when the image is displayed in next time, the suitable sub picture image is displayed based on the album data.

Some of pictures are sometimes taken with improper apertures. In the seventh aspect, after a main picture is taken, sub picture images are taken with apertures shifted from the aperture of the main picture image and added to the main picture image data as its attribute data. When the main picture image has an improper aperture, the image storage/display unit selects suitable one of the sub picture images and records data indicative of the selection of the suitable sub picture image in the album data in place of the main picture image. Thus, when the image is displayed in next time, the suitable sub picture image is displayed based on the album data.

Pictures dealt with in the present invention are still pictures. However, when ambient sound at the time of shooting the picture or a voice comment is added to the picture, the picture becomes more impressive and fascinating when reproduced later. In the eighth aspect, ambient sound ranging between the before and after the shutter release is stored and added to the picture image data as its attribute data. When the picture image is displayed, the image storage/display unit reproduces the voice data as the attribute data together with the picture image.

The first to eighth aspects can be carried out respectively independently or in combination.

In accordance with other aspect of the present invention, there is provided an image display method for displaying an image shot by an electronic image capturing unit, the image capturing unit comprising an optical imaging system, image pickup means for converting a focused image to electronic image data, data application means for applying attribute data to the image data, and storage means for storing therein the image data and attribute data in mutually associated relationship; the method comprising the steps of classifying the image data on the basis of the attribute data for album grouping, and selecting, in an image display mode, the image data on every album basis to display a selected image data. In general, the attribute data include a picture number for uniquely designating the image.

When displaying the image, the image and attribute data are collectively transferred from the storage means of the electronic image capturing unit to the second storage of the display device, a plurality of the image and attribute data collectively transferred are grouped into a single file list, and a file number for identifying a file is added to the file list.

It is practical that an album includes a plurality of picture lists and each of the picture lists has at least the file number and picture number. When displaying pictures in each album, the image data are automatically retrieved from the film list and displayed on the display.

Further, an album includes a plurality of pages and the picture lists are grouped on every page basis. Thus the user can see pictures on every page basis with the same feeling as to actually see a physical album.

At the time of displaying the images, a plurality of the image data are retrieved from a file list on the basis of the file number and picture number of the picture list is displayed on a display with respect to each page, at which time the image data to be displayed on the screen are processed on the basis of control data contained in the picture list. More in detail, the control data includes at least one of trimming control data for designation of image trimming, scaling control data for enlargement or reduction of the image and display position control data for control of a display position of the image in the display screen. Thus, the user can rearrange pictures and change the size or orientation of the pictures in each page according to user's preference.

The attribute data includes at least one of image shooting condition data, image shooting time data and user input identification data, the film number and picture number are selectively extracted from the file list stored in the second storage means on the basis of the data to form a picture list of a pair of the extracted file and picture numbers, and a plurality of the picture lists form the album. Thus the user can edit and classify the albums according to themes inputted by an user.

In accordance with still other aspect of the present invention, there is provided an electronic image capturing unit which comprises an optical imaging system, image pickup means for converting a focused image to electronic image data, image capturing control means for shooting a shooting subject by a plurality of times at different time points to obtain a plurality of image data, an operator for performing operation over one of the plurality of image data as reference data and the other image data to obtain an operation result, and storage means for storing therein the operation result as attribute data.

In this connection, it is desirable that the shooting of a subject by the plurality of times is carried out under changed shooting conditions and that the operator comprises a differential operator for calculating a difference between the reference data and the other image data and storing the difference. In addition, it is practical that the reference and the attribute data are stored in the storage means in a set. With such an arrangement, picture shooting can be facilitated without any shooting failure while eliminating the need for the storage to increase its memory capacity.

BRIEF DESCRIPTION OF THE DRAWINGS

FIG. 12 is a chart of examples of attribute data in the picture data;

FIG. 14 is a chart of examples of a film header in the film list data of FIG. 13;

FIG. 16 is a detailed structure of an album header in the album list data;

FIG. 18 is a detailed structure of a picture list data of the page list data;

FIG. 21 is a table showing examples of the picture list;

FIG. 22 is a table showing examples of the page list;

FIG. 23 is a table showing an example of the album header;

FIG. 28 is a table showing examples of attribute data in the picture data of FIG. 27;

FIG. 29 is an example of a picture list;

FIG. 33 is a table showing examples of attribute data in the picture data of FIG. 32;

FIG. 34 is an example of a picture list;

FIG. 37 is a table showing examples of attribute data in the picture data of FIG. 36;

FIG. 38 is an example of a picture list;

FIG. 43 is an example of a picture list;

FIG. 47 is an example of a picture list.

DESCRIPTION OF THE PREFERRED EMBODIMENTS

Figure 1:
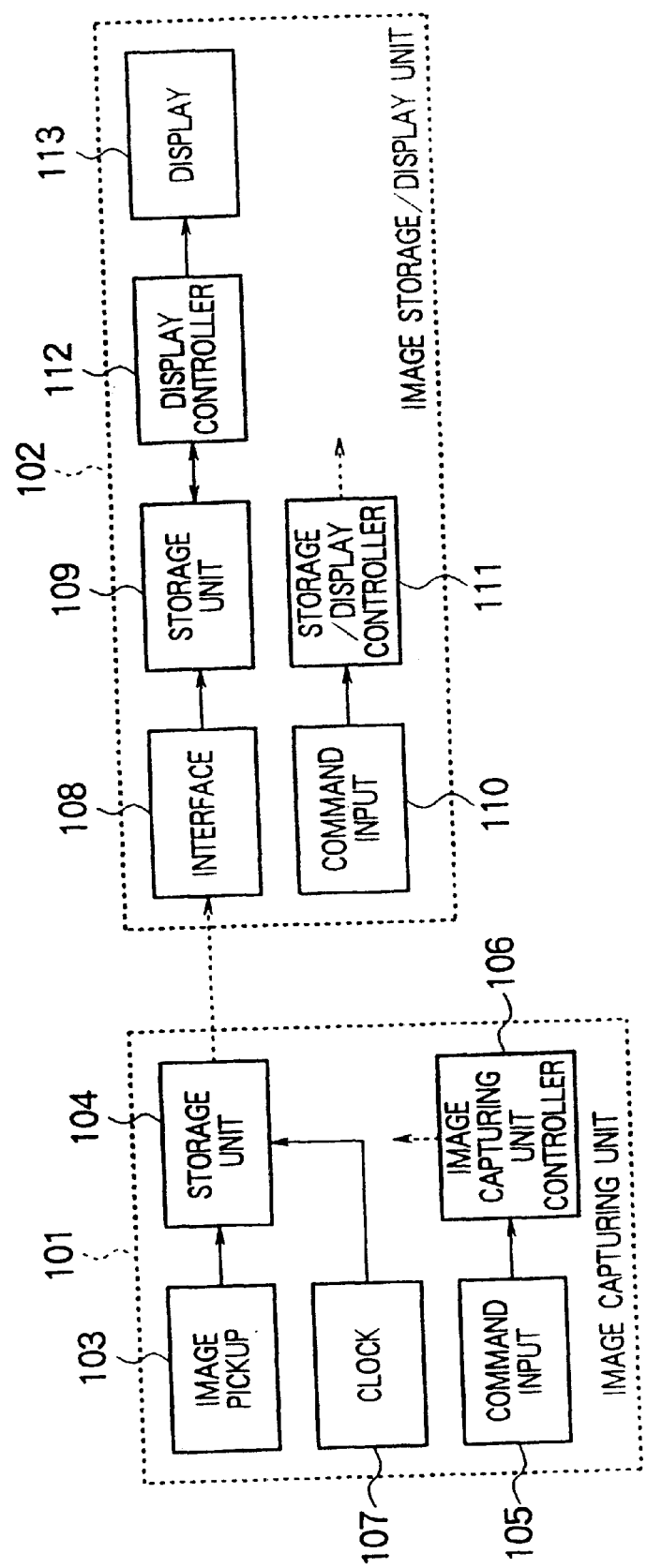
FIG. 1 is a block diagram of an image recording/reproducing system in accordance with a first embodiment of the present invention.

A first embodiment of the present invention will be explained. Referring to FIG. 1, there is shown a block diagram of an electronic photography system in accordance with the first embodiment of the present invention. The illustrated electronic photography system comprises a image capturing unit 101 and an image storage/display unit 102.

The image capturing unit 101 captures image and temporarily saves the data of the image before the data is sent to the image storage/display unit 102. More specifically, an image pickup part 103 captures the image from outside the image capturing unit and converts the captured data into electronic picture image data. The image pickup part 103 then sends the converted electronic data to a storage unit 104 to be stored therein. The storage unit 104 comprises a semiconductor memory, a magnetic disk device, a floppy disk device or an optical disk device. Optimumly used as the storage unit 104 is an IC card provided with a semiconductor memory and with a backup power source, since it is desirable that the storage unit 104 has no mechanically movable parts and the storage unit 104 is only required to temporarily store information until the information is sent to the image storage/display unit. A command input part 105 is used to input a command to be given to the image capturing unit 101 through a shutter for determination of capture timing of picture image data. An output of the command input part 105 is sent to a image capturing unit controller 106 where a control signal for controlling the image capturing unit 101 is generated. A clock 107 outputs a date (year, month and day) and time. The date and time when picture image data is captured are used as an attribute data of the picture image data, so that the attribute data is stored in the storage unit 104 together with the picture image data.

The image storage/display unit 102 receives the picture image data and attribute data from the image capturing unit and displays the picture data thereon. More in detail, the image storage/display unit 102 accepts data from the image capturing unit through an interface 108. In the case where the storage unit 104 of the image capturing unit 101 cannot be removed from the image capturing unit unlike a magnetic disk, the image storage/display unit 102 is connected directly to the image capturing unit 101 to read out the picture and attribute data from the magnetic disk via the interface. In the case where the storage of the image capturing unit is such a removable medium as an IC card, a floppy disk or an optical disk, on the other hand, the interface 108 of the image storage/display unit 102 may be replaced by a corresponding type of drive unit. The picture and attribute data received from the image capturing unit is saved in a storage unit 109. The storage unit 109 of the image storage/display unit 102 preferably comprises a magnetic tape device, a magnetic disk device or an optical disk device, since the storage unit 109 is required to save therein the picture and attribute data semi-permanently and also required to have a large capacity. Because of its fast accessing time an exchangeable medium, the optical disk device is most preferable. A command input part 110 is used to enter a command to the image storage/display unit 102 with use of a switch or a pen tablet. An output of the command input part 110 is sent to a storage/display controller 111 where a control signal for controlling the image storage/display unit 102 is generated. Album data is created on the basis of the picture and attribute data received at the storage unit 109. The album data will be described later. In a display controller 112, display data is created based on the attribute and album data and sent to a display 113. The display 113, which displays the picture data thereon, comprises, e.g., a color liquid crystal display (LCD). Of course, the display 113 may comprise a CRT display in place of the CCD or a monitor may be provided outside the image storage/display unit 102, as necessary.

Data transfer from the image capturing unit 101 to the image storage/display unit 102 is not necessary to be carried out every time a picture image is acquired. That is, picture images can be continually acquired to such an amount that corresponds to the possible memory capacity of the storage unit 104 of the image capturing unit 101, and the accumulated picture can be collectively transferred to the image storage/display unit 102. Although the image capturing unit 101 has been provided separately from the image storage/display unit 102 in FIG. 1, the image capturing unit 101 may be provided integral with the image storage/display unit 102, as a matter of course. In the latter case, the storage unit 104 for temporary memorization of data in the image capturing unit 101 becomes unnecessary and the picture and attribute data are written in the storage unit 109 of the image storage/display unit 102.

Figure 2:
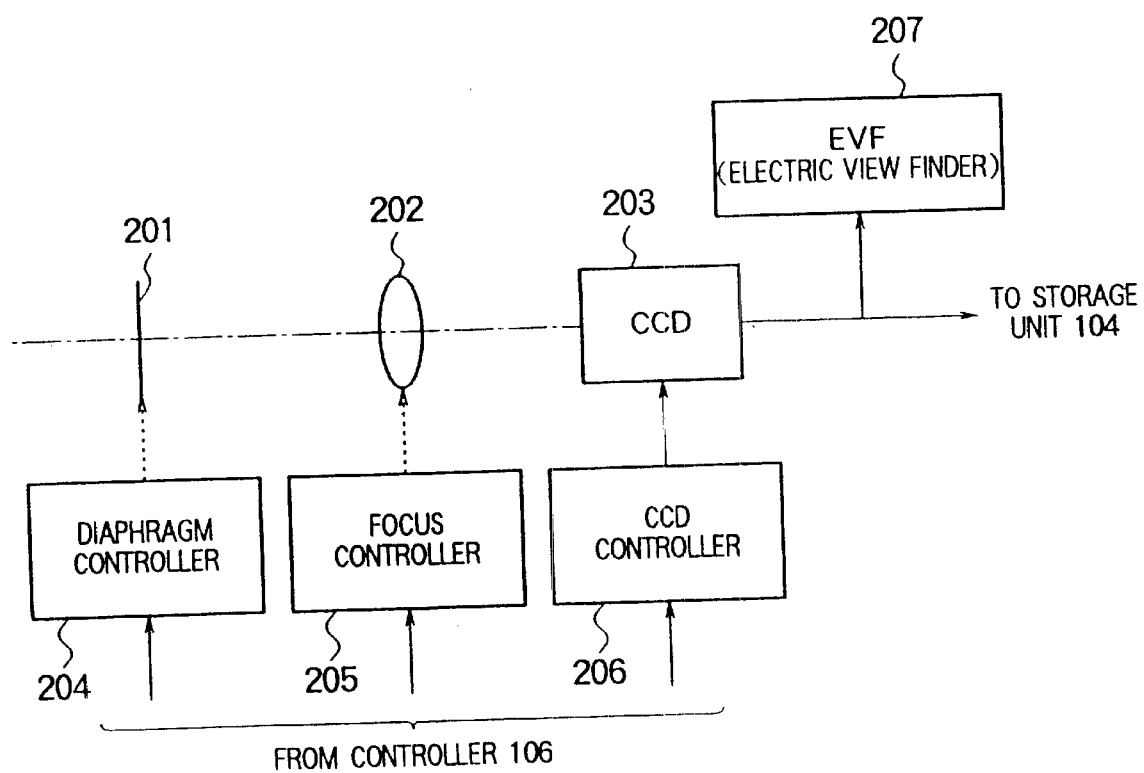
FIG. 2 is a detailed block diagram of an image pickup part in an image capturing unit in the system of FIG. 1.

Shown in FIG. 2 is a detailed diagram of the image pickup part 103 of the image capturing unit 101 in FIG. 1. More specifically, incident light is passed through a stop or diaphragm 201 and a lens 202 to form an image on a charge coupled device (CCD) 203. A diaphragm controller 204 changes an aperture size of the diaphragm 201 on the basis of a command from the image capturing unit controller 106 of FIG. 1. A focus controller 205 moves the lens 202 on the basis of the command from the image capturing unit controller 106. The diaphragm 201 and the lens 202 are automatically controlled by the image capturing unit controller 106 of FIG. 1 so that an image having a suitable exposure is focused on the CCD 203. A CCD controller 206, on the basis of the command from the image capturing unit controller 106 of FIG. 1, transfers the picture data to the storage in a form of electric signal. The electric signal of the picture data is sent from the CCD 203 also to an electric view finder (EVF) 207 to allow an operator to visually observe the picture data.

Figure 3:
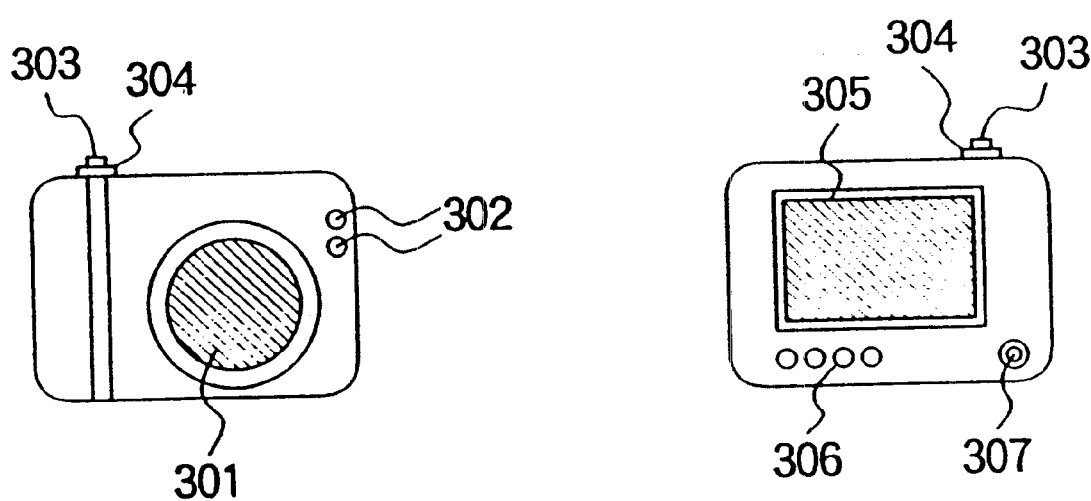
FIG. 3 is a plane view of an example of appearance of the image capturing unit in FIG. 1.

FIG. 3 shows an example of appearance of the image capturing unit in the present invention. The illustrated image capturing unit has a shape similar to an image capturing unit using an ordinary silver halide film. A lens 301 of the image capturing unit provided in its front side is the same as the lens 202 shown in FIG. 2. The lens 301 is driven in response to the operation of a zoom button 302 to change a picture image capturing range. A shutter is of a two step type which comprises a first shutter release 303 to be firstly pushed and a second shutter release 304 to be secondly pushed subsequent to the first shutter release 303. A liquid crystal panel 305 of the image capturing unit provided in its rear side uses the output of the EVF 207 of FIG. 2 to display a picture image being shot thereon. The liquid crystal panel 305 is also used as a display panel for inputting command into the image capturing unit. The command input is carried out by an operator selecting a menu displayed on the liquid crystal panel 305 with use of an input button 306. A connector 307 is connected with an external cable when it is desired to externally read out the picture and attribute data temporarily stored in the storage unit 104 of the image capturing unit 101 in FIG. 1. When the storage unit 104 of the image capturing unit 101 is of such a type that such medium as floppy disk, optical disk or IC card can be extracted from the storage unit 104, the aforementioned data reading is carried out by shifting the medium containing the data to a desired external device.

Figure 4:
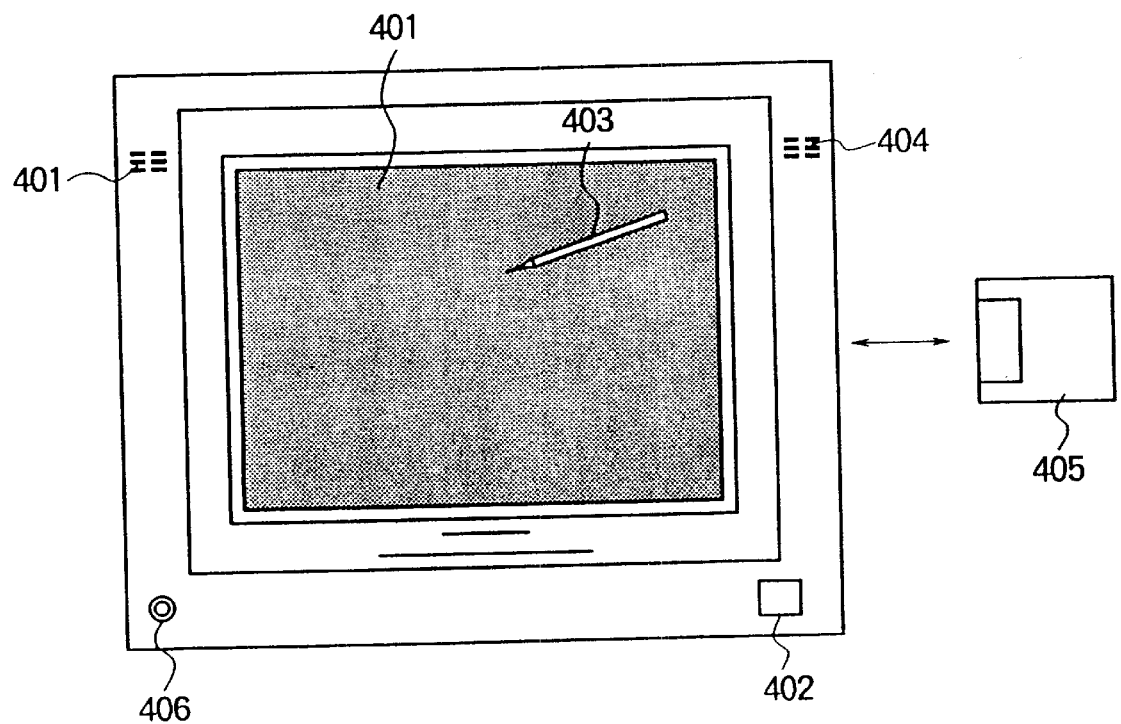
FIG. 4 is a plane view of an example of appearance of an image storage/display unit in the system of FIG. 1.

FIG. 4 shows an example of appearance of the image storage/display unit in the present invention. The illustrated image storage/display unit, for the purpose of providing portability, has a liquid crystal panel 401 and designed to have a document paper size corresponding substantially to A4 or LTR. A switch 402 is a start switch and all operations or commands other than the starting operation are given through a pen input device 403. Provided in the upper left and right sides of the liquid crystal panel 401 are loudspeakers 404 to also provide a voice output. FIG. 4 is an example when an optical disk device is used as the storage unit 109 of the image storage/display unit 102 of FIG. 1, in which case an optical disk 405 is inserted into a side slot of the image storage/display unit. The image storage/display unit also has a connector 406 which is connected with an external cable when it is desired to read the picture and attribute data into the image storage/display unit from the image capturing unit. When the storage unit 104 of the image capturing unit 101 of FIG. 1 comprises an optical disk device, the shift of the picture and attribute data can be realized by the user inserting its optical disk into the side slot of the image storage/display unit. That is, when the storage unit 104 of the image capturing unit 101 comprises a floppy disk device or IC card device and the image storage/display unit also contains the corresponding type of device, data shift can be realized without the external cable.

FIGS. 5 to 9 show examples of display screen of the image storage/display unit in the present invention. It is assumed that all operations or commands to the display unit are given with use of the pen input device.

Figure 5:
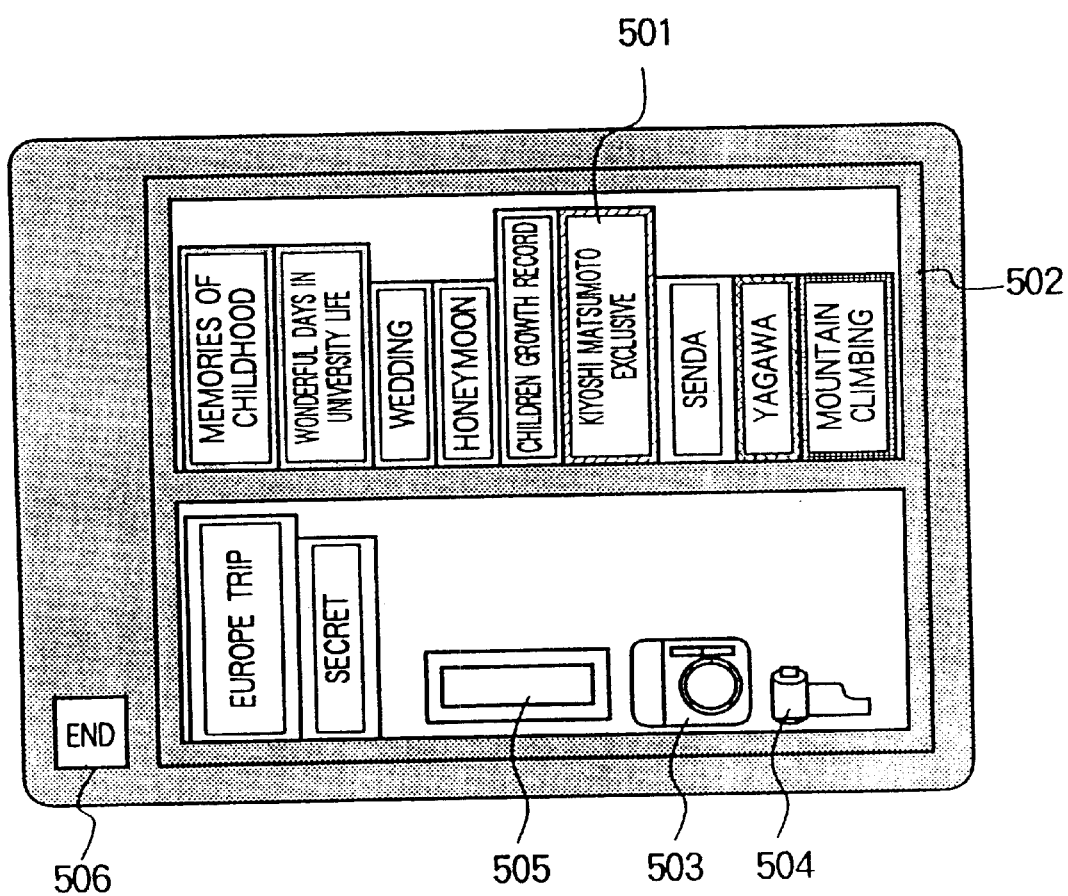
FIG. 5 is a plane view of an example of display of the image storage/display unit in FIG. 1.

When the operation of the image storage/display unit starts, there appears such a book-shelf type initial screen as shown in FIG. 5. Picture images are classified into an album 501 which is then arranged in a book shelf 502. Such albums are generated according to an album list to be described later. When the user clicks an image capturing unit icon 503, this causes the image storage/display unit to be put in such a capture mode that the image storage/display unit can capture the picture and attribute data from the image capturing unit. When the user clicks a file icon 504, this causes the image storage/display unit to be put in such an edit mode that the user can edit a file list as an assembly or set of picture and attribute data. When the user clicks an album icon 505 illustrated in the form of a white sheet, this causes the image storage/display unit to be put in such a mode that a new album can be generated and a new album list is generated based on the file list. The file and album lists will be detailed later. When the user clicks an end icon 506, this causes the system to be turned off.

Figure 6:
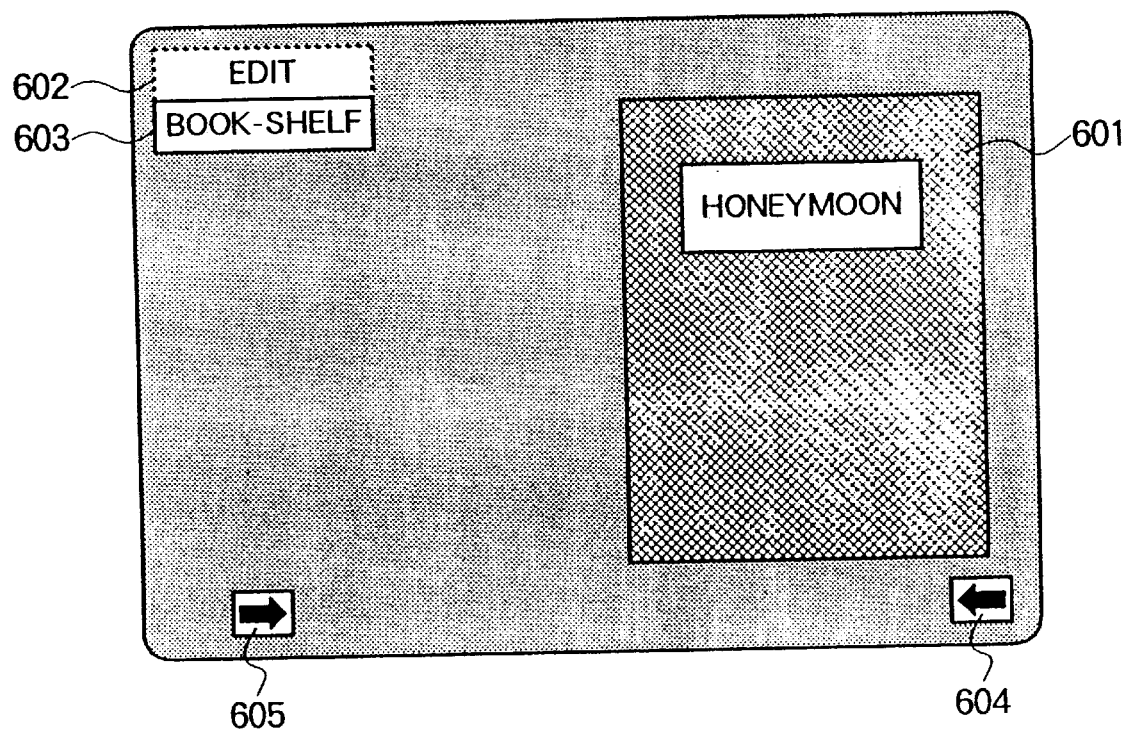
FIG. 6 is a plane view of another example of the display of the image storage/display unit.

In FIG. 5, when the user clicks the shelf-back of desired one of albums arranged in the book shelf, this causes the display screen to be changed to such a screen as shown in FIG. 6. Also displayed on the screen of FIG. 6 are, in addition to a front cover 601 of the album, an edit tool icon 602, a book-shelf icon 603 and page-leafing icons 604 and 605. In this case, the edit tool icon 602 is previously set in its select disable mode. When the user clicks the book-shelf icon 603, this causes the current screen to be returned to such an initial book-shelf screen as shown in FIG. 5. When the user clicks the page-leafing icon 604 or 605, this causes the left or right page of the album to be leafed.

Figure 7:
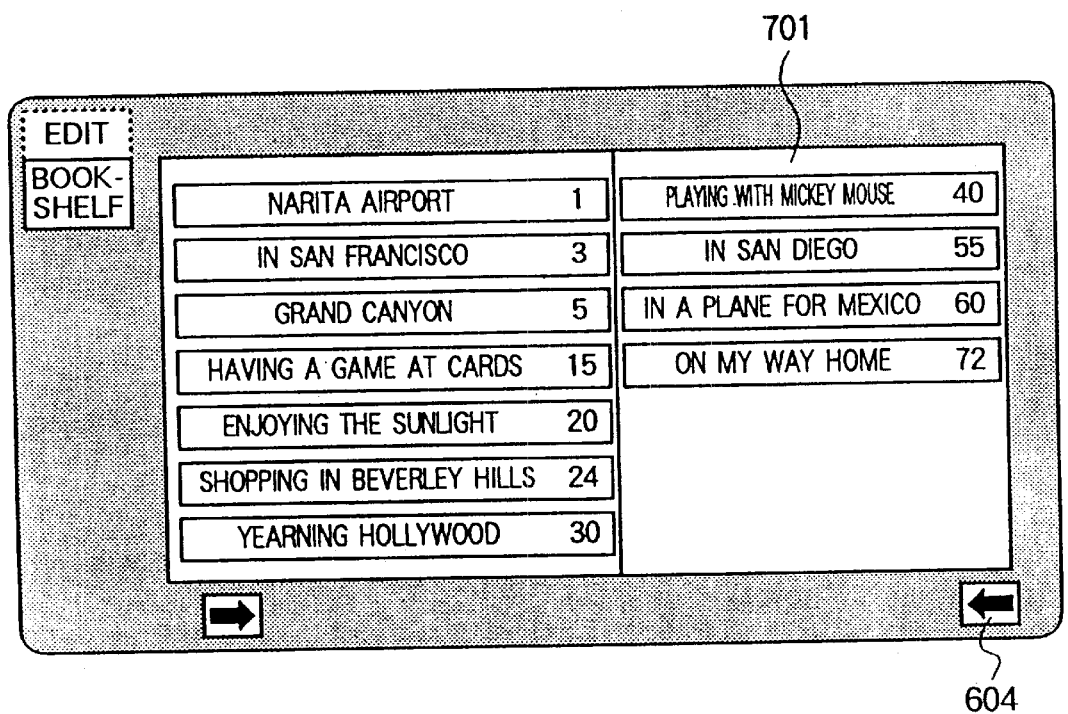
FIG. 7 is a plane view of a further example of the display.

In FIG. 6, when the user clicks the page-leafing icon 604, this causes such a contents screen 701 as shown in FIG. 7 to appear. The contents screen is made up of icons each having a pair of contents name and page. When the user clicks desired one of such icons, this causes the screen to be skipped to the clicked page. Clicking the contents icon or the page-leafing icon 604 causes such a picture screen 801 as shown in FIG. 8 to appear.

Figure 8:
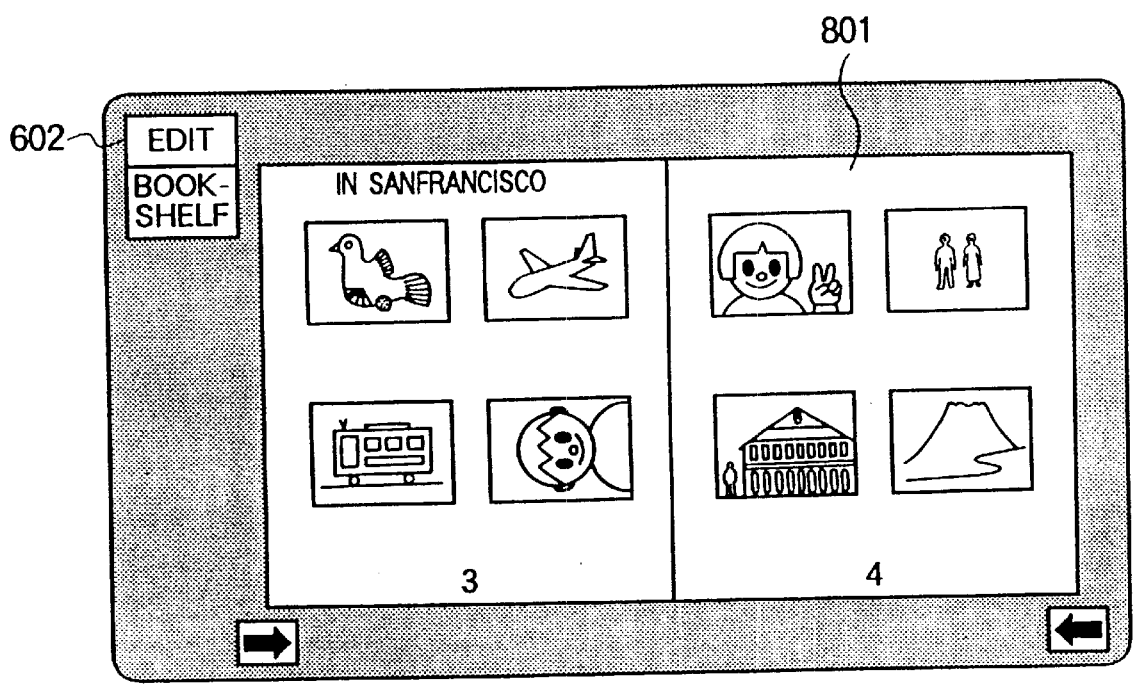
FIG. 8 is a plane view of yet a further example of the display.
Figure 9:
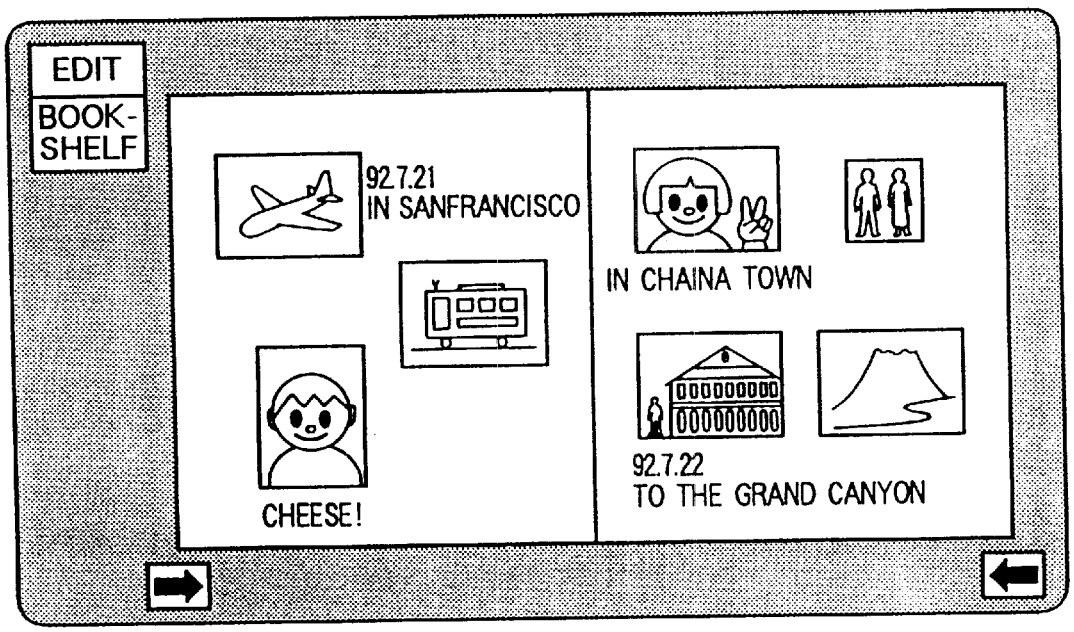
FIG. 9 is a plane view of yet another example of the display.

The picture screen 801, immediately after the album list is generated, has pictures arranged in a preset array as shown in FIG. 8. This is sufficient for usual picture appreciation. However, when the user clicks the edit tool icon 602, the user can perform editing operation over the picture images. Operations available in the edit mode include scaling (enlarging and reducing), rotation, trimming and moving of picture images, and writing of comments with use of a pen input device. An example of the screen of FIG. 8 after subjected to such editing operations is shown in FIG. 9.

Figure 10:
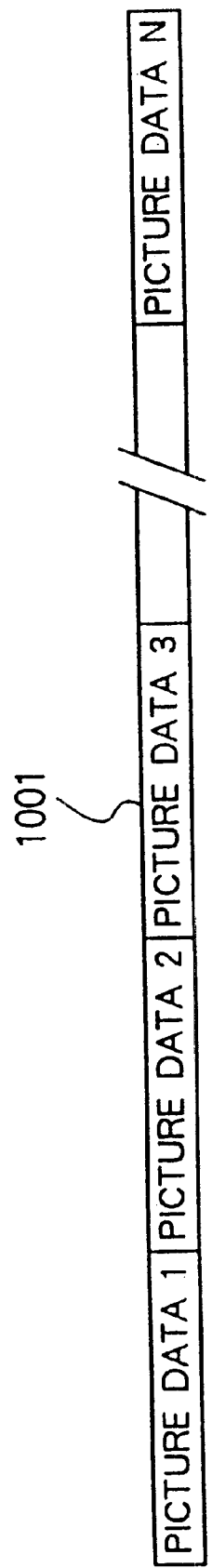
FIG. 10 is a structure of picture data in the image capturing unit.

FIG. 10 shows a structure of data in the image capturing unit, in which a plurality of picture data 1001 are sequentially stored in the storage in a shooting date order.

Figure 11:
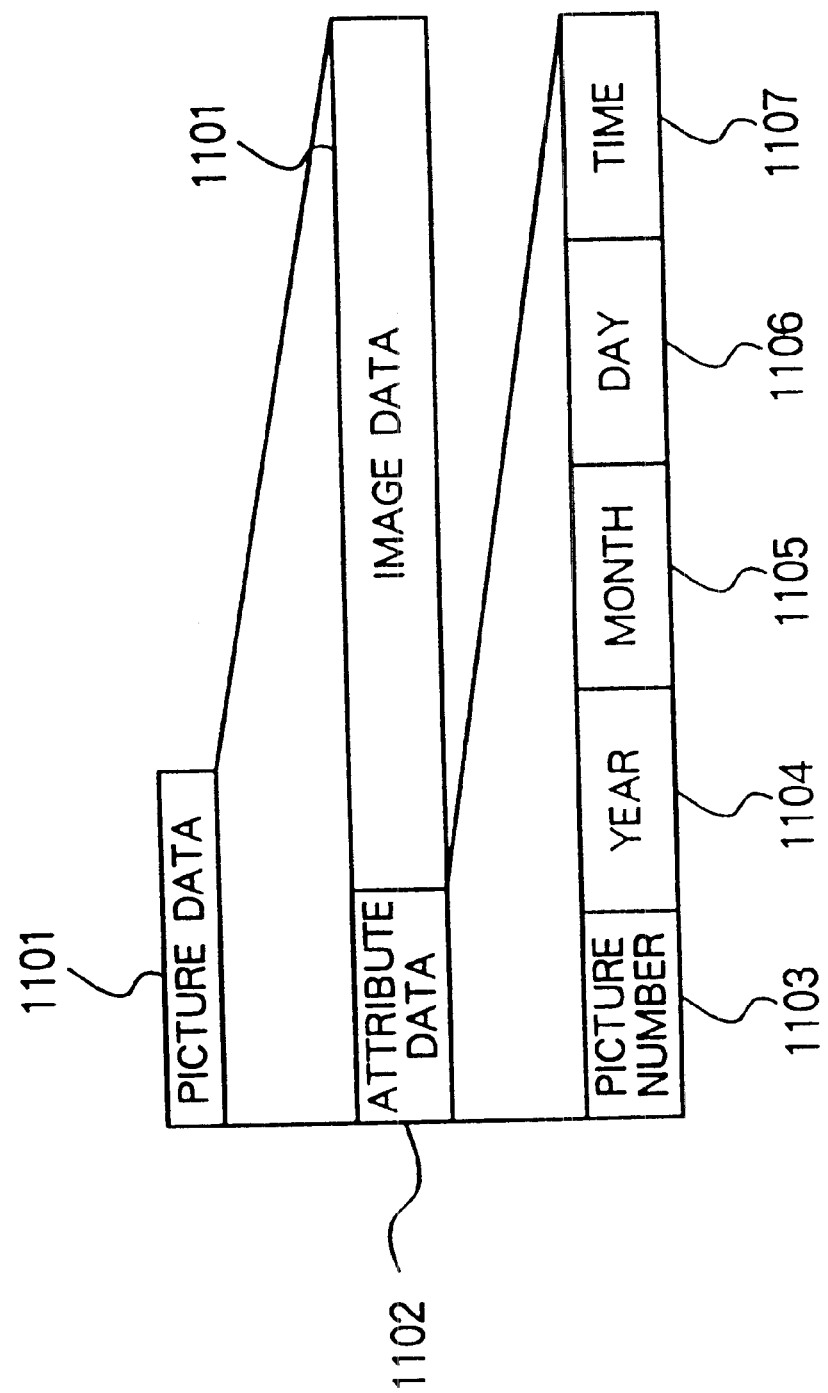
FIG. 11 is a detailed structure of a picture data.

FIG. 11 shows details of one of the plurality of picture data 1001. The picture data 1001 is made up of image data 1101 indicative of the image data itself and attribute data 1102 indicative of data associated with the image data. That is, the image data 1101 is the data itself of the image captured by the image capturing unit, while the attribute data 1102 is the data of attributes relating to the image. In the first embodiment, the attribute data 1102 contains a picture number 1103 applied to an associated picture in its shooting date order as well as a shooting year 1104, a shooting month 1105, a shooting day 1106 and a shooting time 1107 of the picture issued from the clock 107 of FIG. 1.

Examples of such attribute data alone as shown in FIG. 10 are shown in FIG. 12 in a table form.

Figure 13:
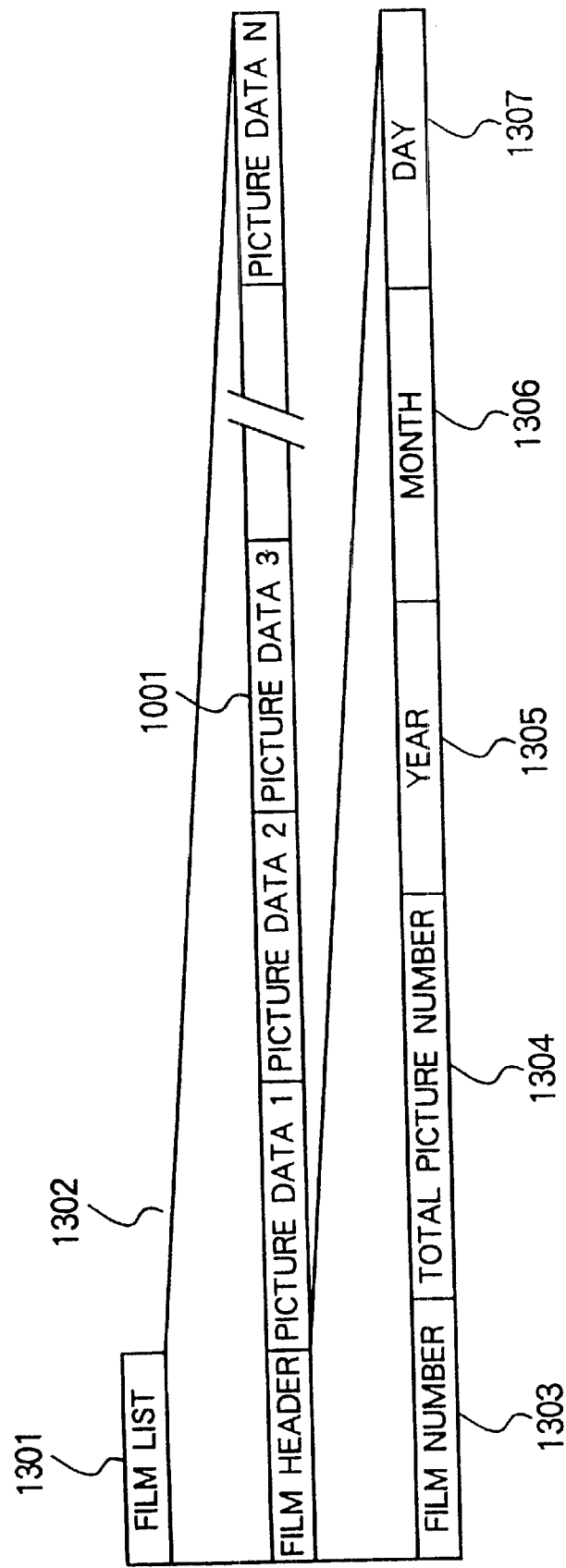
FIG. 13 is a structure of film list data.

When such picture data each having the image and attribute data as shown in FIG. 10 are accumulated by a predetermined amount in the storage unit 104 of the image capturing unit 101 of FIG. 1, the image capturing unit 101 transfers the accumulated data to the image storage/display unit 102. The image storage/display unit 102, on the other hand, when receiving the picture data from the image capturing unit, generates such a file list 1301 as shown in FIG. 13 on the basis of the received picture data. The file list 1301 comprises a file header 1302 and a plurality of picture data 1001 which are the same as those shown in FIG. 10. The file header 1302 comprises a file number 1303, a total picture number 1304 corresponding to the number of pictures contained in the file list, date of the transfer such as year 1305, month 1306 and day 1307. The file list 1301 is used as a source at the time of generating an album to be described later and, when it is desired to display with use of the album list, the display is realized by reading out the image data contained in the file list 1301. The file list 1301 is saved in the storage unit 109 of the image storage/display unit 102 of FIG. 1.

Shown in FIG. 14 are examples of the file header alone in a table form.

Figure 15:
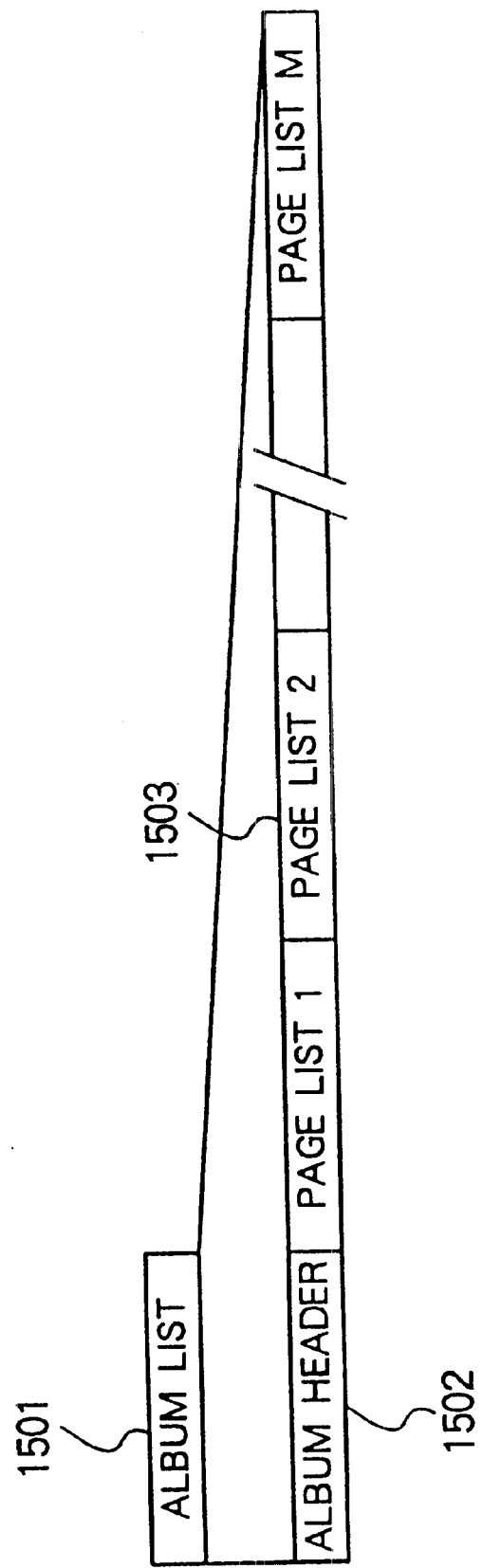
FIG. 15 is a structure of album list data.

FIG. 15 shows a data structure of an album list 1501 which is made up of album header 1502 and one page list 1503 or more.

FIG. 16 shows details of the album header 1502 which is made up of an album number 1601, an album name 1602, a page number 1603, a vertical page width 1604, a horizontal page width 1605, a front cover color 1606 and a front cover pattern 1607. The album number 1601 is applied in an album list generation order and uniquely stored in the image storage/display unit.

Figure 17:
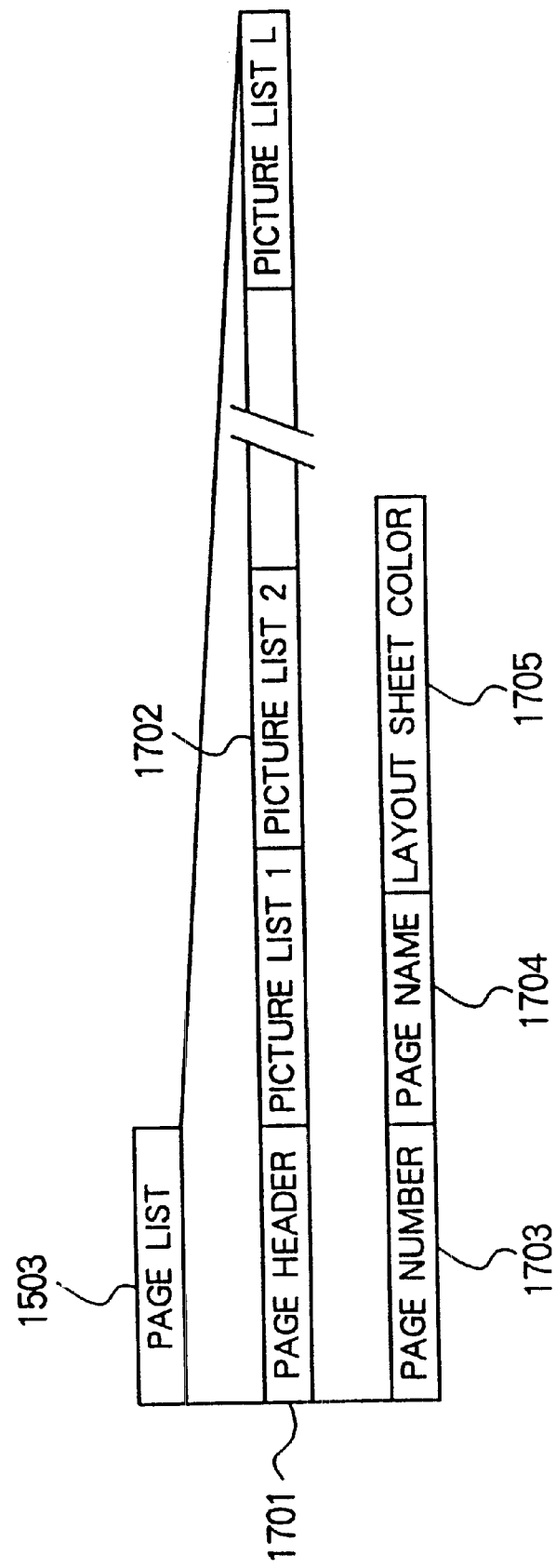
FIG. 17 is a structure of page list data.

FIG. 17 shows details of a data structure of the page list 1503. One page list 1503 is present for one of pages of the album. The page list 1503 is made up of a page header 1701 and a plurality of picture lists 1702. More specifically, the page header 1701 is made up of a page number 1703, a page name 1704 and a layout sheet color 1705 with respect to the associated page. The page number 1703 indicates one of pages of the album and is uniquely provided in the album list 1501.

FIG. 18 shows details of a data structure of the picture list 1702. The picture list 1702 is provided one for each of pictures contained in the page. The picture list 1702 includes a frame number 1801, a film number 1802, a picture number 1803, a trimming start X position 1804, a trimming start Y position 1805, a trimming width (W) 1806, a trimming height (H) 1807, a scaling factor 1808, a rotational angle 1809, a display X position 1810 and a display Y position 1811. The frame number 1801, which indicates the number of the picture to be displayed on the page, is uniquely provided in the page list 1503. For example, when it is desired to display 3 sheets of pictures on one page, the frame numbers 1 to 3 are given. The film number 1802 and picture number 1803 are used to uniquely specify one of the file lists and one of pictures in the specified file list, so that, in the display mode, picture data corresponding to the picture is read out from the file list. The trimming start X position 1804 and trimming start Y position 1805 indicate trimming start X and Y positions of the picture in terms of coordinates respectively. The trimming width (W) 1806 and trimming height (H) 1807 indicate trimming width (W) and height (H) respectively and thus trimming is carried out with this width and height starting from a coordinate point (X,Y) of the trimming start X and Y positions 1804 and 1805. The scaling factor 1808 indicates a display magnification of the picture after subjected to the trimming. The rotational angle 1809 indicates an angle by which the image is displayed as rotated. The display X and Y positions 1810 and 1811 indicate a coordinate point within the page at which the picture is to be displayed.

Figure 19:
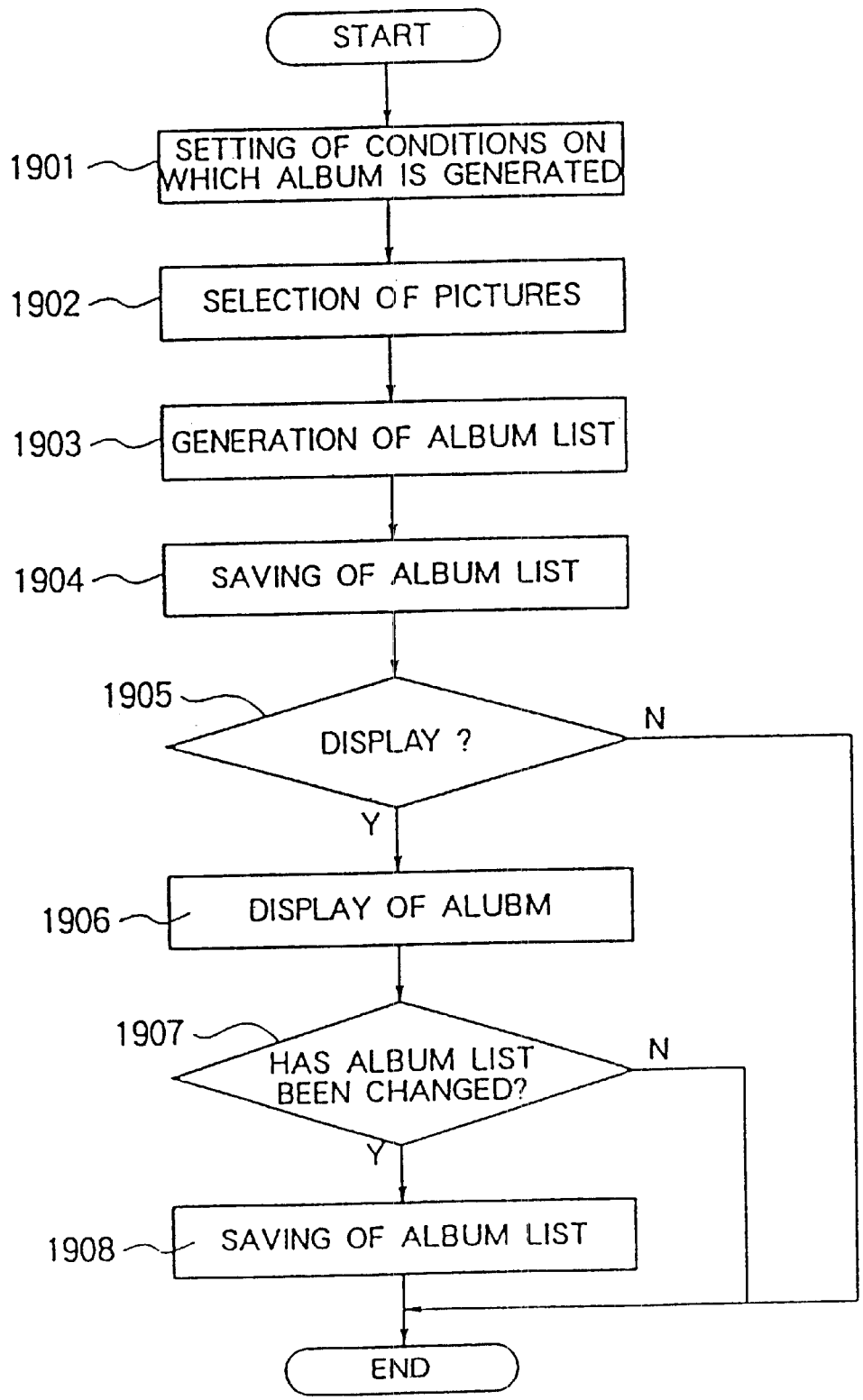
FIG. 19 is a flowchart showing procedures for generating an album list.

FIG. 19 shows a flowchart for explaining how to generate an album list. More in detail, first of all, album generation conditions are set in a step 1901. Corresponding pictures are identified in a next step 1902 on the basis of the set conditions. And in a step 1903, an album list is generated and the generated album list is saved in the storage in a step 1904. In a step 1905, it is determined whether the album is displayed or not. If not, then the system terminates the operation. When the album display is determined, corresponding image data are read out from the file lists on the basis of the album list and the album is displayed in a step 1906. When the album display is completed, it is determined in a step 1907 whether or not there was a change in the album list due to album editing or the like. Determination of a change in the album list causes the album list to be saved in a step 1908; whereas, determination of no album list change causes the system to terminates as it is. This processing flow is generated to generate a new album when the user selects the album icon 505 of the white shelf-back on such an initial or start screen as shown in FIG. 5.

Figure 20:
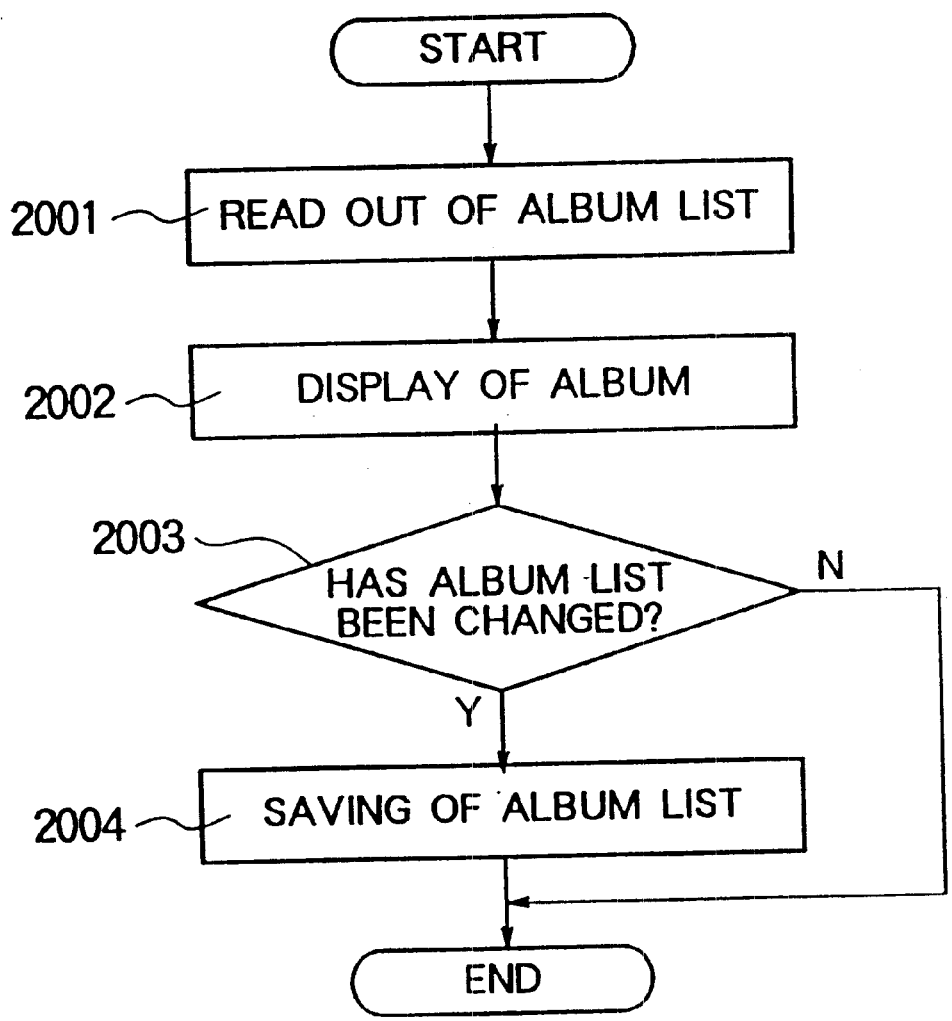
FIG. 20 is a flowchart showing procedures for displaying an album list in the presence of the album list.

A flowchart when an album list is already present is shown in FIG. 20. More in detail, an album list is read out from the storage of the image storage/display unit in a step 2001, and image data are read out from the file lists of the album list to display the album in a step 2002. At the time of completion of the album display, it is determined in a step 2003 whether there was a change in the album list due to album editing. In the presence of an album change, the album list is saved in a step 2004; whereas otherwise the system terminates as it is. This processing flow is generated when the user selects (clicks) the album 501 already created in the initial screen of FIG. 5.

An example of how to generate an album list will be shown with use of FIGS. 21, 22 and 12. In the attribute data shown in FIG. 12, the shooting dates belonging to the picture numbers 14 to 24 are consecutive so that these pictures can be classified into a theme, e.g., "trip". Thus, the user specifies the system in such a manner that the pictures having consecutive dates from 13-rd are combined and applied with different pages for different dates to generate an album.

FIG. 21 shows a table of a picture list thus generated under the above conditions. In this case, 11 pictures satisfy the above conditions and allocated to 4 pages. Slanted areas correspond the ones automatically generated under the conditions and the other areas are filled by default values.

A page list for the album list of FIG. 21 is shown in a table form in FIG. 22. Page attributes of the page list include page generation conditions, i.e., dates on which the pictures in the respective pages were taken. Further, the color of layout sheet is default. The page attribute can be arbitrarily changed. In other words, titles or the like in place of date may be used in the page attributes.

FIG. 23 shows an album header related to FIGS. 21 and 22. An underlined album name, which is input by the user, is used for the display of the album and its shelf-back.

Figure 24:
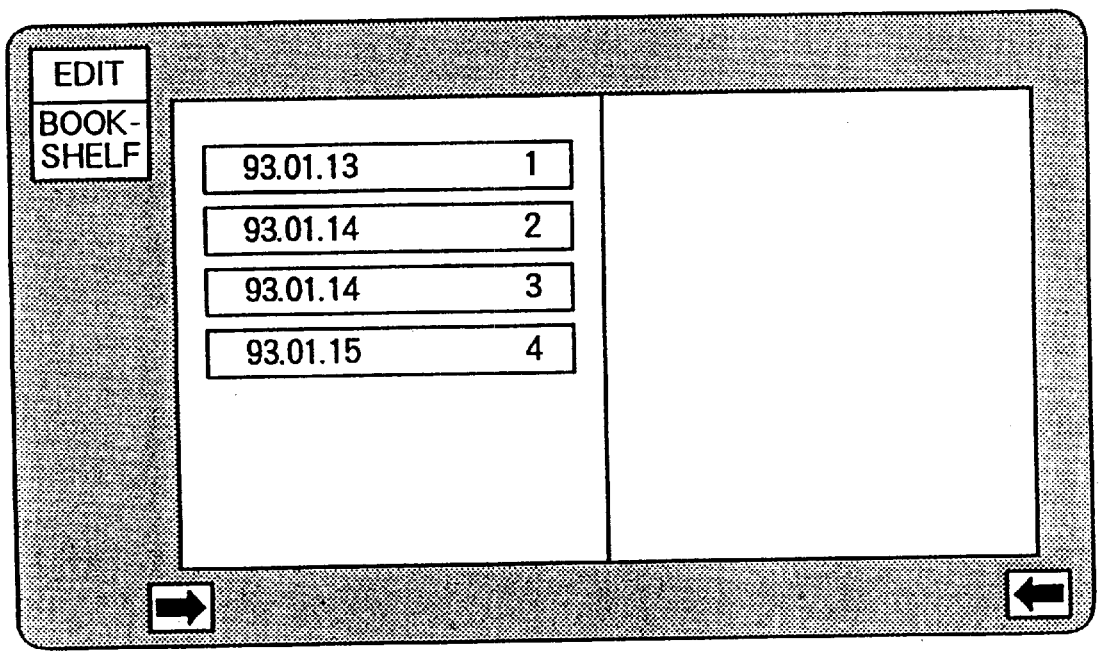
FIG. 24 is a plane view of an example of a contents display screen.
Figure 25:
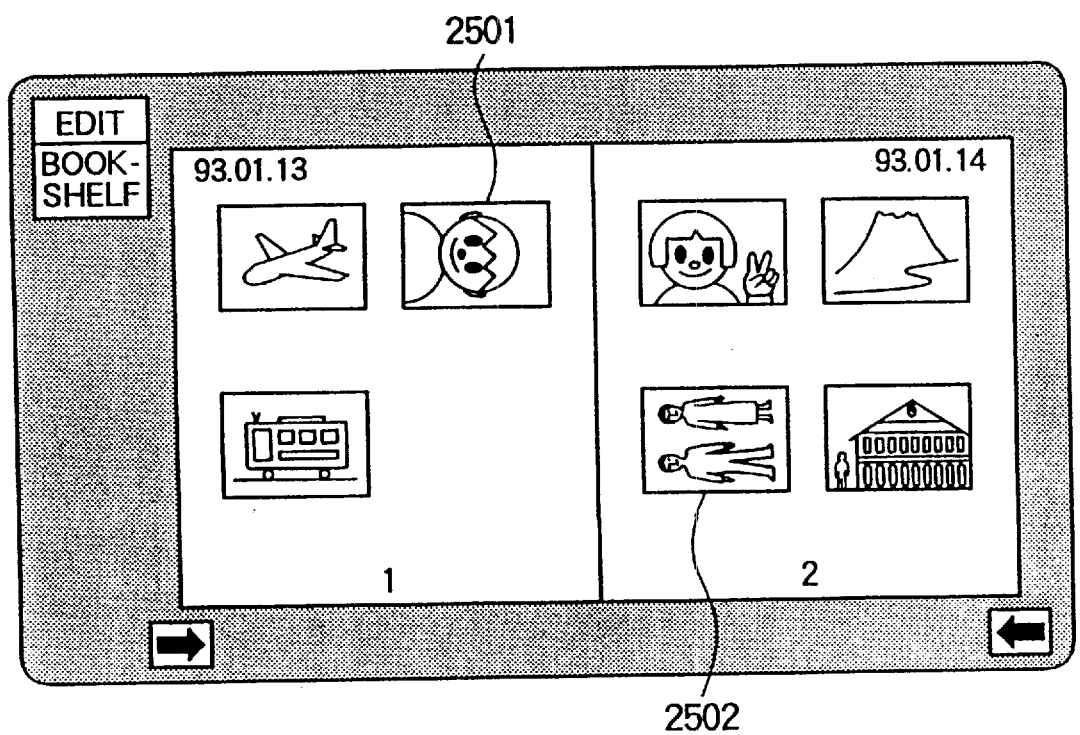
FIG. 25 is a plane view of an example of display of the screen.

FIG. 24 is an example of a contents screen displayed on the basis of the album list, in particular, the page list of FIG. 22. FIG. 25 is an example of a screen when the album is opened on pages 1 and 2, in which not only pictures but also page numbers and page attributes are shown.

As shown by the exemplary display screen of FIG. 2, picture images are not always erected. Such pictures 2501 and 2502 as shown in FIG. 25 may be rotated in the edit mode after displayed, but this is automatically carried out in a second embodiment of the present invention. The second to eighth embodiments of the present invention will be described but explanation thereof will be focused on parts different from the first embodiments.

Figure 26:
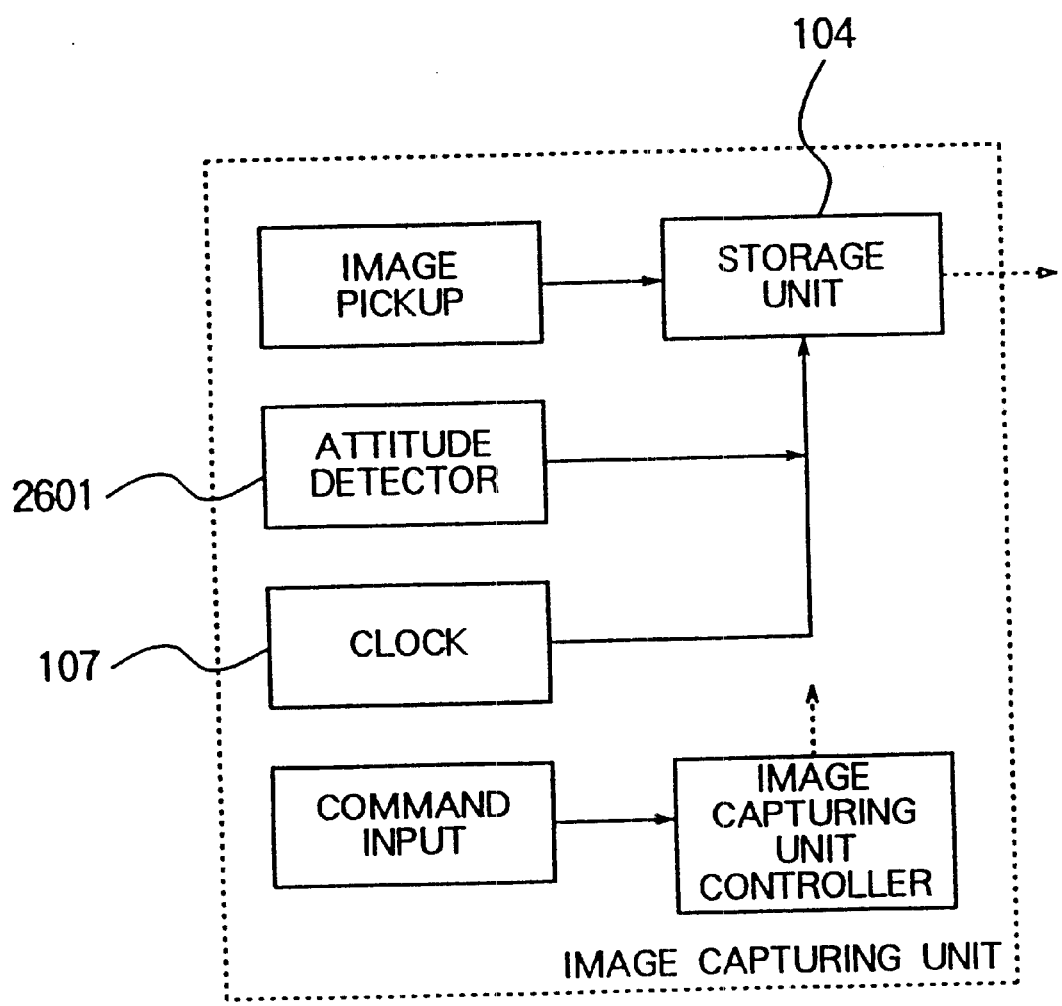
FIG. 26 is a block diagram of an image capturing unit in an image recording/reproducing system in accordance with a second embodiment of the present invention.

In the second embodiment, an attitude detector for an image capturing unit is provided in a image storage/display unit so that an attitude of the image capturing unit at the time of shooting a picture image is applied to picture image data as attribute data. FIG. 26 shows a block diagram of the image capturing unit in the second embodiment. An attribute detector 2601 detects an orientation of the image capturing unit when a picture image was taken. The resolution of the attitude is not required to be so high and thus may be set to have every about-45-degree value. An output of the attribute detector 2601 is sent to the storage unit 104 together with an output of the clock 107 where the output of the detector is used as attribute data of the image data and stored therein. Blocks other than the attribute detector 2601 are substantially the same as those in the first embodiment.

Figure 27:
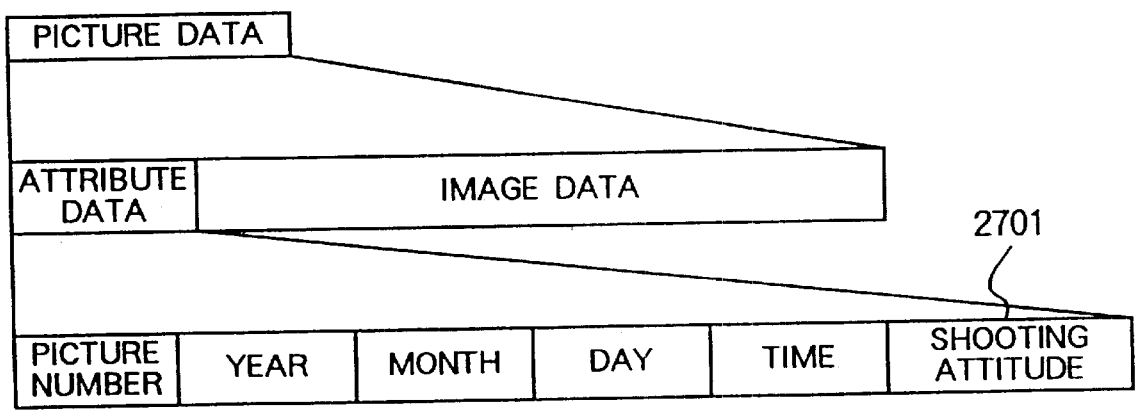
FIG. 27 is a structure of an example of picture data.

Shown in FIG. 27 is an example of picture data in the second embodiment. Attribute data include, in addition to the attributes already explained in the first embodiment, a newly added shooting attitude 2701.

FIG. 28 shows examples of the attribute data in the second embodiment in a table form. In the table, a shooting attitude column 2801 is newly added in FIG. 12.

FIG. 29 is a table of picture lists in an album list generated on the basis of the attribute data examples of FIG. 28. The generation conditions were set to be substantially the same as those in the first embodiment. Slanted areas are the ones automatically generated according to the conditions and the other areas have values by default. Data of a rotational angle column 2901 when images are displayed are automatically generated based on the shooting attitudes of the attribute data.

Figure 30:
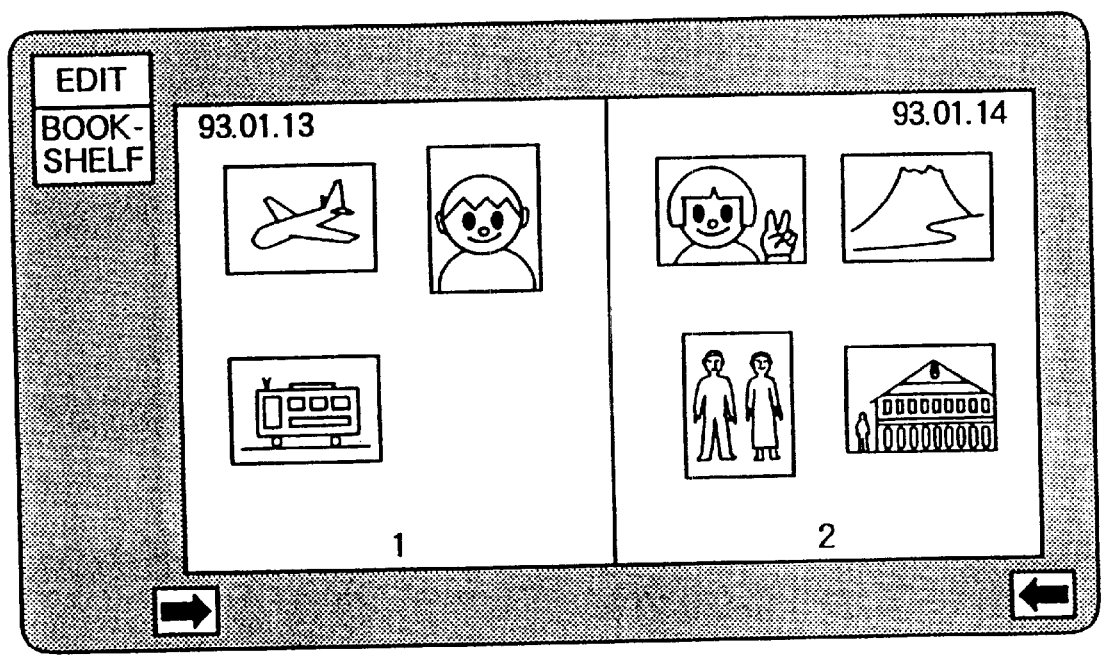
FIG. 30 is an example of a display screen.

FIG. 30 is an example of a screen when the album displayed on the basis of the above album list and the picture list of FIG. 29 is opened on pages 1 and 2. It will be seen when compared to FIG. 25 that all pictures are displayed in their correct orientation.

After pictures are taken, it is often that the photographer cannot remember the shooting places of such pictures at the time of arranging the pictures. Further, for such pictures taken as during a trip are in many cases classified according to their shooting places or cities.

Figure 31:
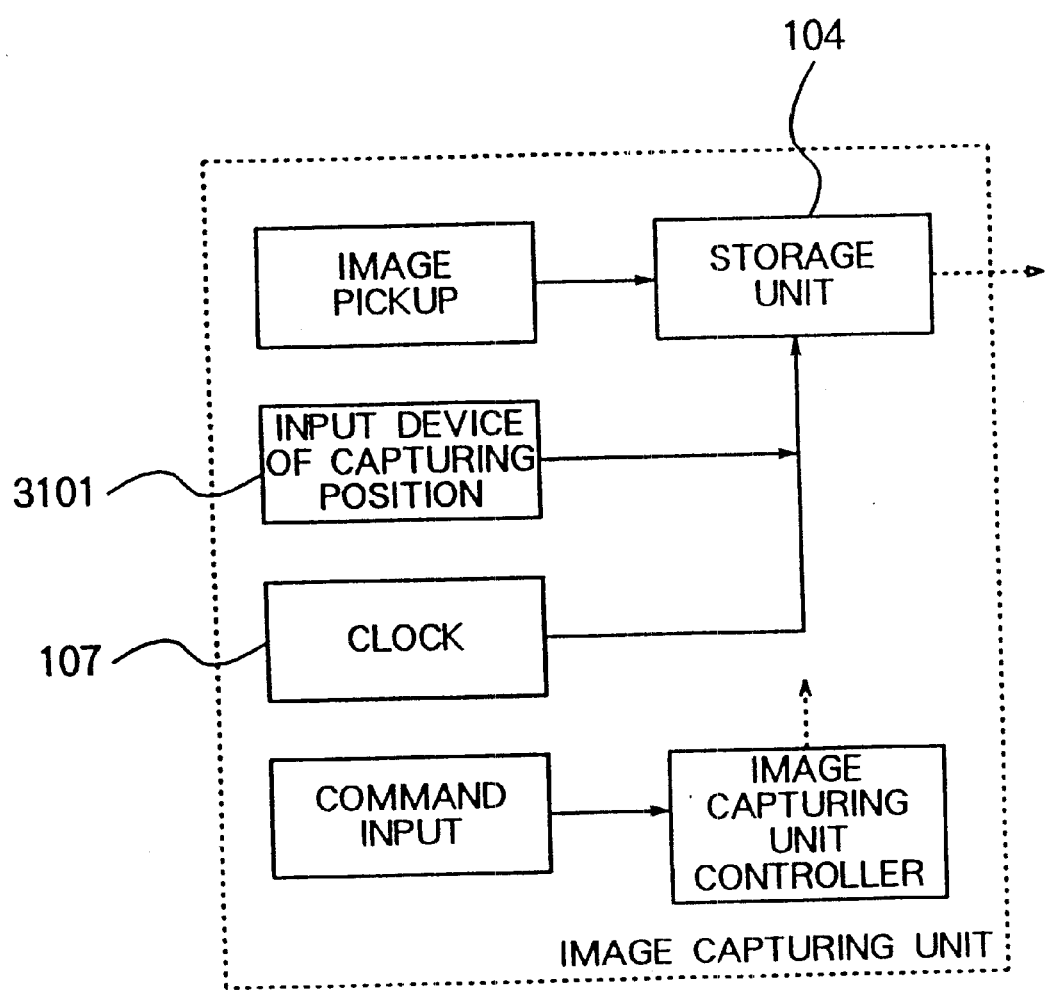
FIG. 31 is a block diagram of an image capturing unit in an image recording/reproducing system in accordance with a third embodiment of the present invention.

In the third embodiment, a shooting place input part is provided in the image capturing unit so that shooting places of picture images are applied to picture image data as attribute data. FIG. 31 is a block diagram of an image capturing unit in an image storage/display unit in accordance with the third embodiment of the present invention. More specifically, a shooting place input part 3101 inputs a picture image shooting place from outside the image capturing unit and holds it until the image capturing unit receives a next input. An output of the shooting place input part 3101 is sent to the storage unit 104 together with an output of the clock 107. When a picture is taken, the output of the shooting place input part 3101 is used as attribute data of the picture image data and stored in the storage unit 104 together with the picture image data. Blocks other than the shooting place input part 3101 are substantially the same as those in the first embodiment.

Figure 32:
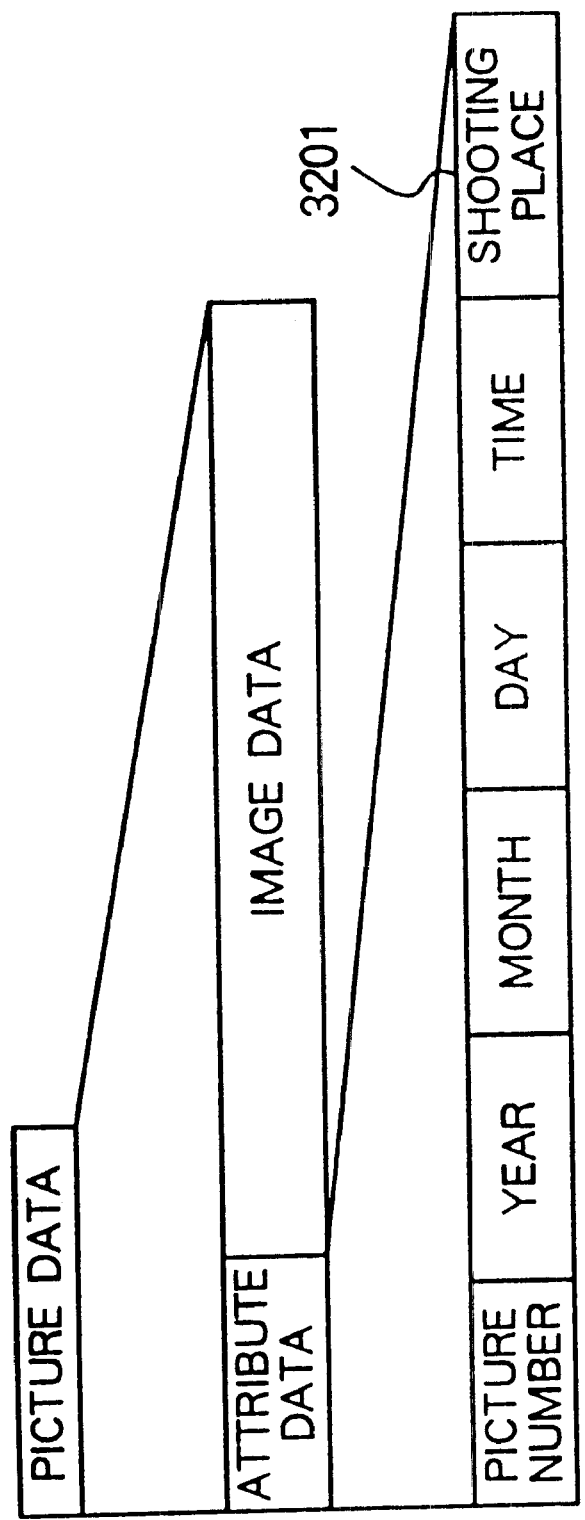
FIG. 32 is an example of picture data.

Referring to FIG. 32, there is shown an example of picture data in the third embodiment, in which attribute data includes, in addition to those already explained in the first embodiment, a newly-added shooting place 3201 at the time of shooting the picture.

FIG. 33 shows examples of the attribute data in the third embodiment in a table form, in which a shooting place column 3301 is newly provided in addition to FIG. 12.

FIG. 34 shows picture lists in an album list generated on the basis of the attribute data examples of FIG. 33 in a table form. The generation condition was set that the shooting place is "Chiba". Slanted areas are the ones automatically generated according to the condition and the other areas have default values.

In the case where a plurality of users commonly use a single image capturing unit, pictures taken by respective persons are mixed. In particular, when the image capturing unit has a large memory capacity corresponding to several hundred pictures, the mixed picture tendency becomes strong.

Figure 35:
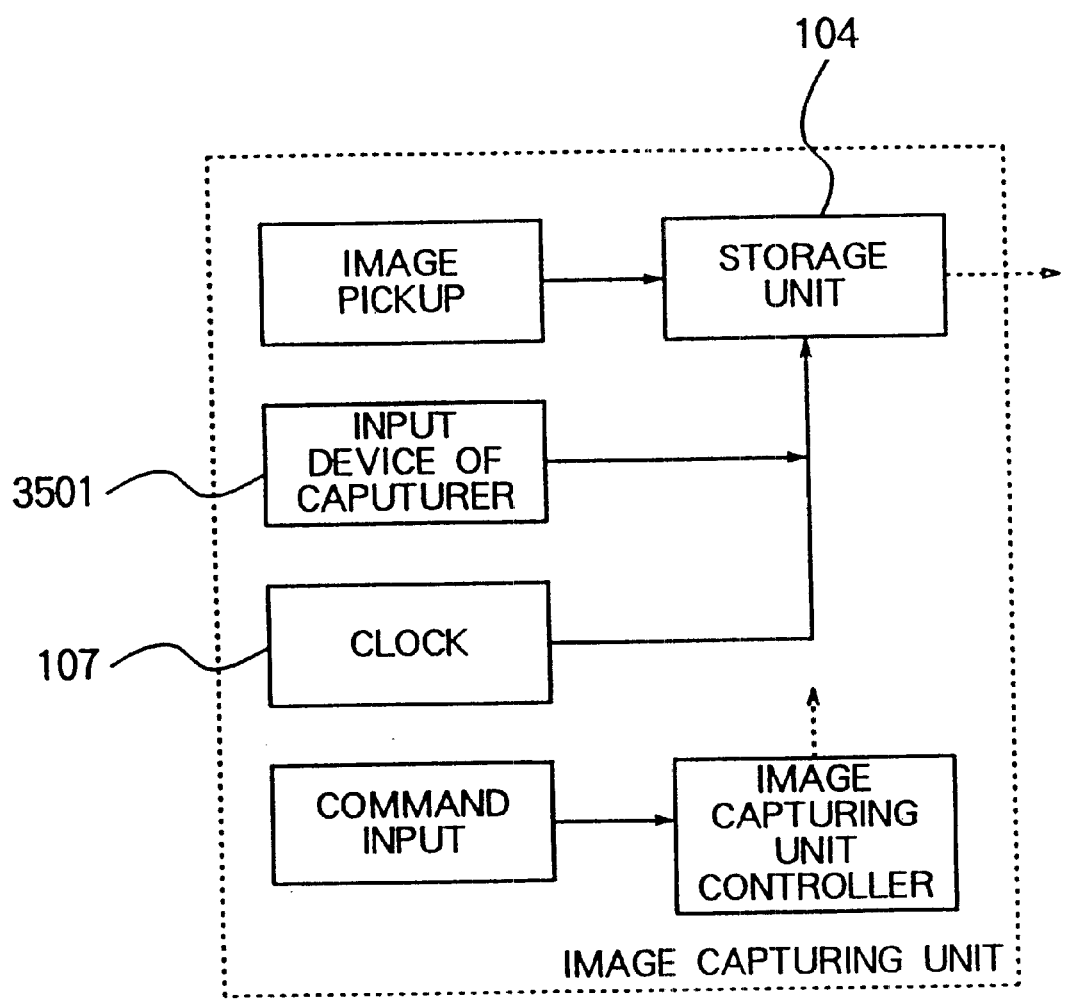
FIG. 35 is a block diagram of an image capturing unit in an image recording/reproducing system in accordance with a fourth embodiment of the present invention.

In the fourth embodiment, a photographer input part is provided in an image capturing unit so that an information concerning a person who took the picture image is added to the picture image data as its attribute data. Shown in FIG. 35 is a block diagram of an image capturing unit in an image storage/display unit in accordance with the fourth embodiment of the present invention. More in detail, a photographer input part 3501 inputs a picture shooting person from outside the image capturing unit and holds it until the image capturing unit receives a next input. An output of the photographer input part 3501 is sent to the storage unit 104 together with an output of the clock 107. When a picture is taken, the output of the photographer input part 3501 is used as user attribute data of the picture data and stored in the storage unit 104 together with the picture data. Blocks other than the photographer input part 3501 are substantially the same as those in the first embodiment.

Figure 36:
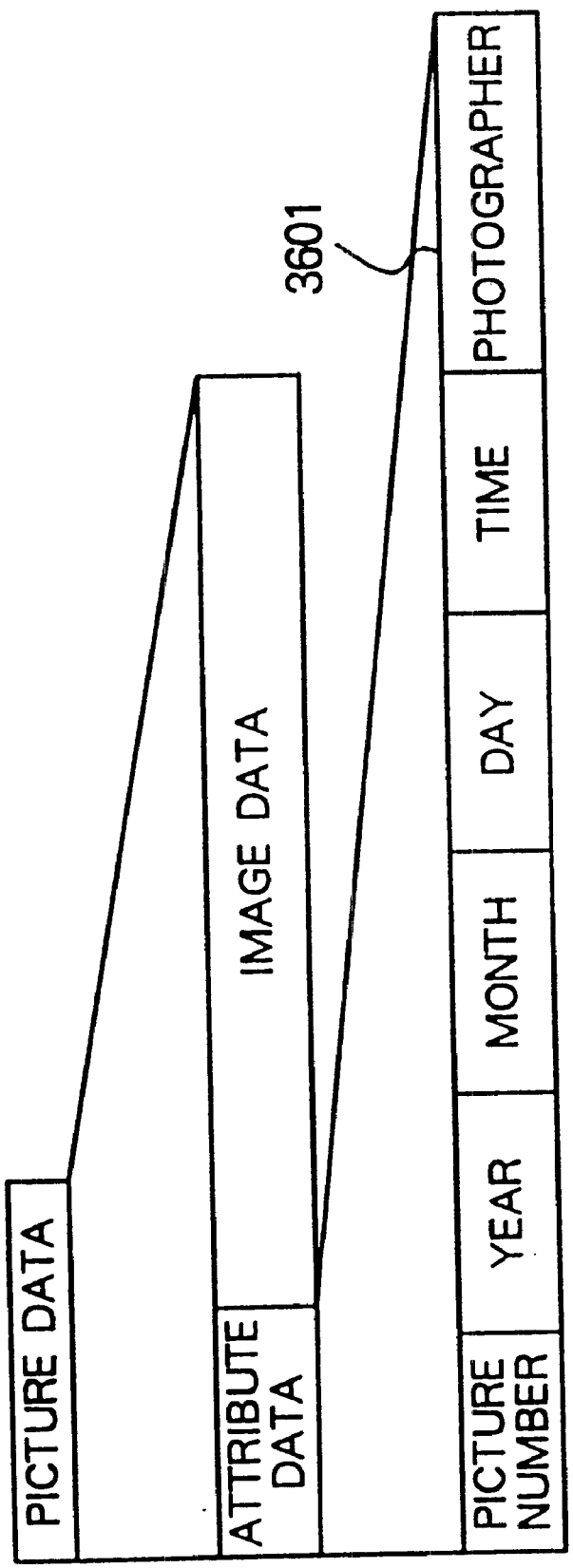
FIG. 36 is an example of picture data.

FIG. 36 shows an example of picture data in the fourth embodiment, in which attribute data include, in addition to those already explained in the first embodiment, a newly-added photographer 3601.

FIG. 37 shows examples of the attribute data in the fourth embodiment in a table form, in which a photographer column 3701 is newly provided in addition to FIG. 12.

FIG. 38 shows a table of picture lists in an album list generated on the basis of the attribute data examples of FIG. 37 in the fourth embodiment. In this case, the generation condition was set so that the photographer is "Kiyoshi Matsumoto". Slanted areas are the ones automatically generated according to the condition and the other areas are set to have default values.

It often occurs that a user misses a good shutter release timing by some of the persons or subjects being shot who close their eyes at the moment that the user depresses the shutter release, or other reasons. In the fifth embodiment, a sub picture image is taken at a time in the vicinity of the moment a main picture image was taken, and data on the sub picture image is applied to the main picture data as attribute data of the main picture image. Further, a desired image is selected from the main picture data or from the sub picture data as the attribute data to be display on the image storage/display unit.

Some of pictures are often turned out to be out of focus. In the sixth embodiment, a sub picture image is taken with a different focus at a time in the vicinity of the moment that a main picture image was taken, and data on the sub picture image is applied to the main picture image data as attribute data of the main picture data. Further, a desired image is selected from the main picture image data or from the sub picture image data as the attribute data to be displayed on the image storage/display unit.

Some of pictures are often turned out to have an improper aperture when the pictures are closely observed. In the seventh embodiment, a sub picture image is taken at a time in the vicinity of the moment that a main picture image was taken, and data on the sub picture image is applied to the main picture image data as attribute data of the main picture data. Further, a desired image is selected from the main picture image data or from the sub picture image data as the attribute data to be displayed on the image storage/display unit.

Figure 39:
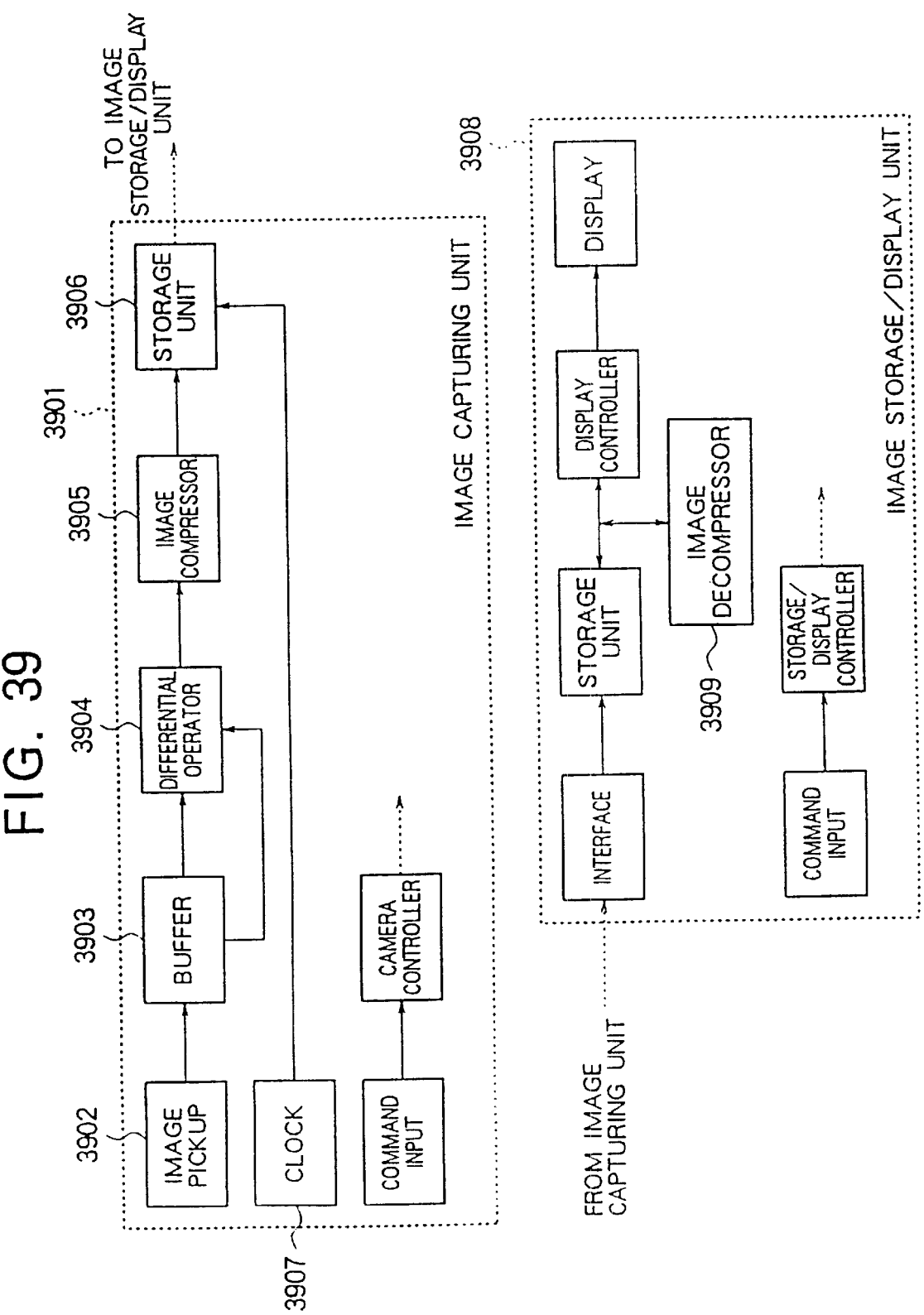
FIG. 39 is a block diagram of an image capturing unit and an image storage/display unit in an image recording/reproducing system in accordance with fifth, sixth and seventh embodiments of the present invention.

FIG. 39 shows a block diagram of an image capturing unit 3901 and an image storage/display unit 3908 in a image recording/reproducing system in accordance with the fifth, six and seventh embodiments of the present invention. In the drawing, more specifically, an image pickup 3902 of the image capturing unit 3901 captures a picture image from outside the image capturing unit and converts it into electronic image data. The image data is sent to a buffer 3903 and stored therein. The buffer 3903 can store therein a plurality of sheets of picture images. A differential operator 3904 reads out the image data from the buffer 3903 and performs differential operation over the read-out data. The differential operator 3904 also has another function of merely passing the image data without performing the differential operation over the image data. An output of the differential operator 3904 is sent to an image compressor 3905 to be compressed. An output of the image compressor 3905 is sent to a storage 3906 and stored therein. A clock 3907 and the storage 3906 are substantially the same as the corresponding ones in the first embodiment. An image expander or decompressor 3909 is provided in the image storage/display unit 3908. This is because the image compressed in the image capturing unit 3901 is to be expanded or decompressed. The other parts are substantially the same as the corresponding ones in the first embodiment.

Figure 40:
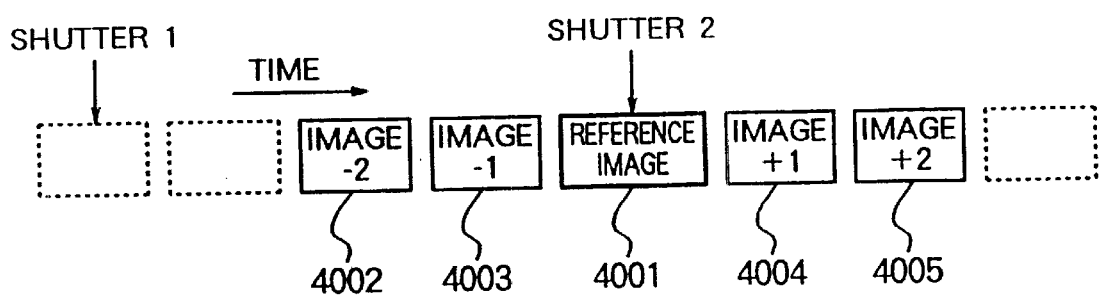
FIG. 40 is a diagram for explaining the operation of the fifth embodiment.

Explanation will be made as to the operation of the fifth embodiment with use of FIGS. 40, 2, 3 and 39. In the image capturing unit of FIG. 3, when the user pushes the first shutter release 303, this causes the diaphragm controller 204 and focus controller 205 in FIG. 2 to start their operation, so that the image capturing unit automatically carries out its aperture and focus controlling operation over a subject. Thereafter, the data is captured into the buffer 3903 from the image capturing unit of FIG. 39 at intervals of a predetermined time, e.g., 0.3 seconds. The buffer 3903, which is of a first in first out (FIFO) type, when becoming full of image data, discards the stored data from the older image data. When the user pushes the second shutter release 304, this causes the then image to be captured as a main picture image together with several sub images subsequent to and precedent to the main image. Thereafter, the differential operator 3904 performs its differential operation between the main and sub picture images with the main picture image used as a reference picture image. FIG. 40 is an example when a reference image and each two sub images subsequent to and precedent to the reference image are used. More in detail, a reference image 4001 corresponding to the main image when the second shutter release 304 was pushed as well as an image −2 (4002) and an image −1 (4003) precedent to the main image and an image +1 (4004) and an image +2 (400) subsequent to the main image are stored in the buffer 3903. The buffer 3903 first sends the reference image 4001 to the differential operator 3904. The differential operator 3904 in turn passes the reference image to be sent to the image compressor 3905. The differential operator 3904 then calculates a difference between the image −1 (4003) and the reference image 4001 and sends its calculation result to the image compressor 3905. Similarly, the image compressor 3905 calculates differences between the images +1 (4004), −2 (4002) and +2 (4005) and the reference image and sends them to the image compressor 3905. The image compressor 3905 in turn compresses the images received from the differential operator 3904 and sends it to the storage 3906.

Figure 41:
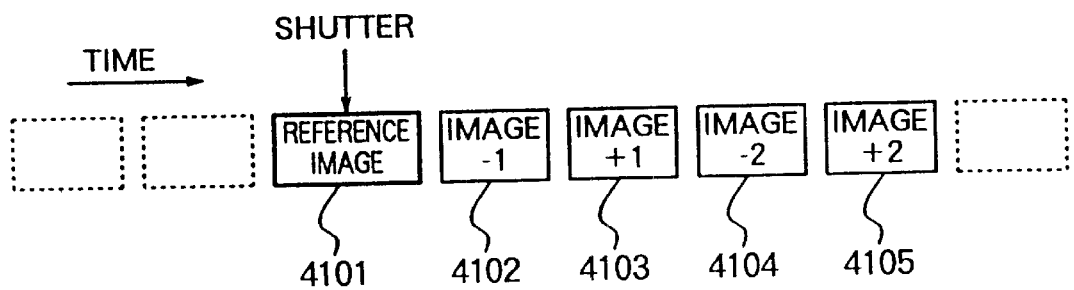
FIG. 41 is a diagram for explaining the operation of the sixth and seventh embodiments.

Explanation will be made as to the operation of the sixth and seventh embodiments of FIGS. 6 and 7 with use of FIGS. 41, 2, 3 and 39. In the image capturing unit shown in FIG. 3, when the user pushes the first shutter release 303, this causes the operation of the diaphragm controller 204 and focus controller 205 in FIG. 2 to start their operation to thereby perform automatic aperture and focus controlling operation over a subject to be shot. Depression of the second shutter release 304 causes the image capturing unit to capture the then image as a main image and also to capture several images subsequent to the main image at times spaced by a short time interval as sub images. The sub images are captured into the image capturing unit with their focuses shifted in the sixth embodiment and their apertures shifted in the seventh embodiment. After such images have been captured in the image capturing unit, the differential operator 3904 calculates differences between the main image as a reference image and the sub images. FIG. 41 is an example in which a main image is used as a reference image and four images subsequent to the reference image are used as sub images. More specifically, a main image obtained by a depression of the second shutter release 304 as a reference image 4101 as well as images −1 (4102), +1 (4103), −2 (4104) and +2 (4105) subsequent to the reference image 4101 are stored in the buffer 3903. Symbol "−" indicates to shift the focus or aperture in its negative direction, while symbol "+" indicates to shift the focus or aperture in its positive direction. Number "1" or "2" indicates the amount of such shift. That is, "+2" means to shift the focus or aperture in the positive direction more than "+1". The buffer 3903 sends the reference image 4101 to the differential operator 3904. The differential operator 3904 in turn passes the reference image to the image compressor 3905. The differential operator 3904 calculates a difference between the image −1 (4102) and the reference image 4101 and sends its results to the image compressor 3905. Similarly, the differential operator 3904 calculates differences between the reference image and the images +1 (4103), −2 (4104) and +2 (4105) and sends its results to the image compressor 3905. The image compressor 3905 compresses the images received from the differential operator 3904 and sends them to the storage 3906.

Figure 42:
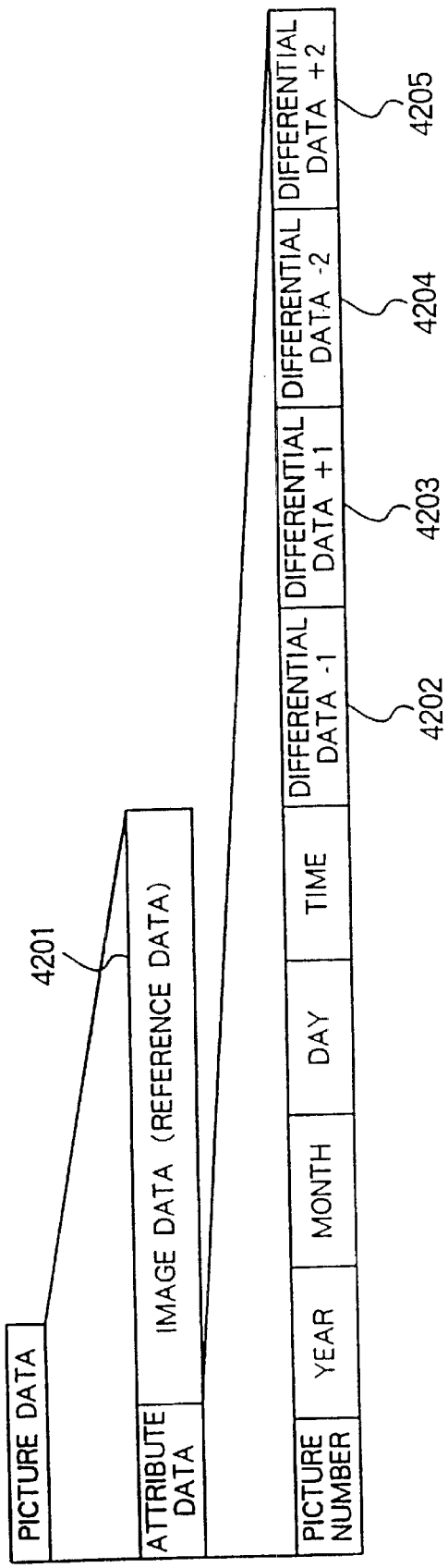
FIG. 42 is a structure of a picture data.

Shown in FIG. 42 is a data structure of the picture data in the fifth, sixth and seventh embodiments. More in detail, the picture data has attribute data and image data 4201. The image data 4201 contains reference data corresponding to a compression of the reference image (4001 or 4101). Meanwhile, contained in the attribute data are differential data −1 (4202), +1 (4203), −2 (4204) and +2 (4205) which correspond respectively to compressions of the differences between the images −1 (4003 or 4102), +1 (4004 or 4103), −2 (4002 or 4104), +2 (4005 or 4105) and the reference image (4001 or 4101) and which are arranged in this order.

FIG. 43 is a table showing examples of picture lists in an album list in the fifth, sixth and seventh embodiments. This table is substantially the same as that in the first embodiment, except that a display number column 4301 is newly added. Immediately after the album list was generated, the display number has a default of "0". That is, this means that the main image is to be displayed. However, when the main image is not well taken and the sub image is taken well, the sub image can be selected. The number of the selected sub image is previously recorded in the display number column. This example is shown in FIG. 43 by underlined numbers. When it is desired to read out the above album list next time to display it, the picture corresponding to not the main image but the sub image is displayed.

Pictures processed by the system are still pictures. However, when the ambient sound at the time of shooting the picture or a voice comment is applied to the picture, this causes the picture to be more impressive and fascinating. In the eighth embodiment, at the same time that a picture is shot, voice data in the shooting place are also recorded at times in the vicinity of the shooting time moment and applied to the picture image data as attribute data of the picture image. When it is desired to display this picture image data later, the voice data as the attribute data can be reproduced.

Figure 44:
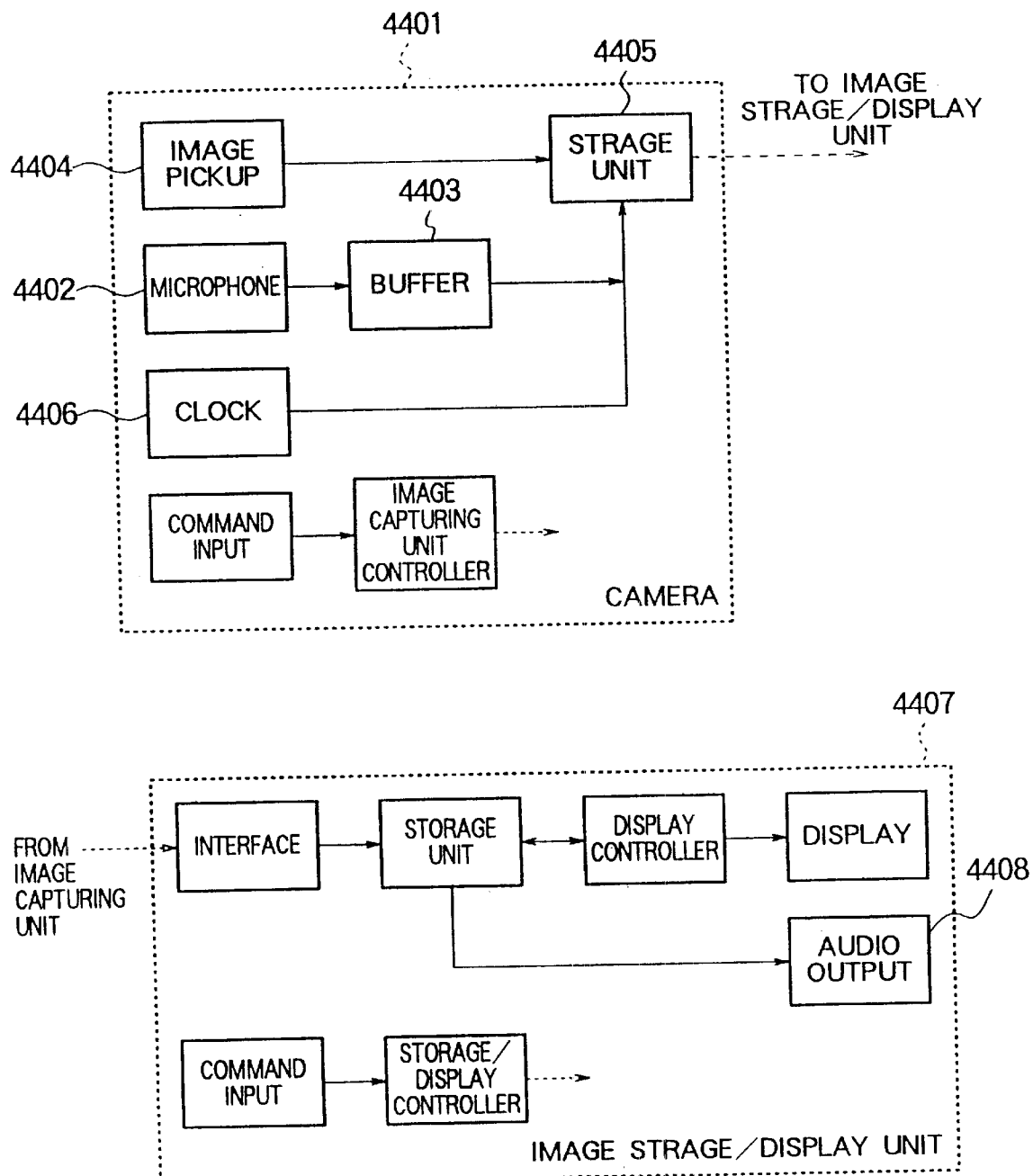
FIG. 44 is a block diagram of an image capturing unit and an image storage/display unit in an image recording/reproducing system in accordance with an eighth embodiment of the present invention.

FIG. 44 is a block diagram of an image recording/reproducing system in accordance with the eighth embodiment of the present invention. More specifically, an image capturing unit 4401 includes a microphone 4402 which captures external voice and converts it into electronic voice data. The voice data is sent from the microphone 4402 to a buffer 4403 to be stored therein. The buffer 4403 can store therein voice data corresponding to about 10 seconds of voice. An output of the buffer 4403 is sent to a storage 4405 together with image data received from an image pickup 4404 to be stored therein, in accordance with an output from a clock 4406. The other parts are substantially the same as those in the first embodiment. A voice output part 4408 is provided in an image storage/display unit 4407. This is for the purpose of reproducing voice data. The other parts are substantially the same as those in the first embodiment.

Figure 45:
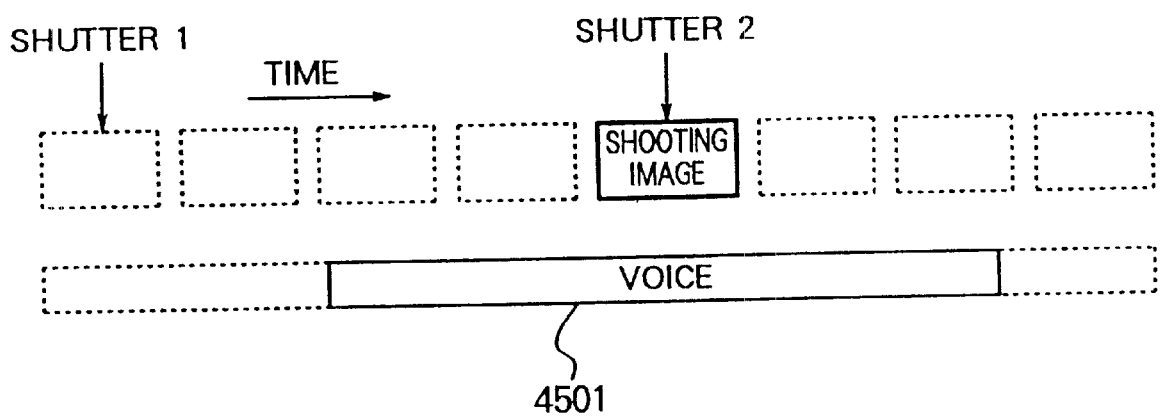
FIG. 45 is a diagram for explaining the operation of the eighth embodiment.

Explanation will next be made as to the operation of the eighth embodiment with use of FIGS. 45, 3 and 44. In the image capturing unit shown in FIG. 3, when the user pushes the first shutter release 303, this causes voice 4501 captured by the microphone 4402 to be sent to the buffer 4403. The buffer 4403, which is of a FIFO type, when getting full of image data, discards the image data sequentially from its older data. Depression of the second shutter release 304 in FIG. 3 causes the image capturing unit to capture the shooting picture image and also the voice 4501 of several seconds later. Thereafter, the voice 4501 before and after the picture shooting time moment is fetched from the buffer 4403 and sent to the storage 4405 together with the image data.

Figure 46:
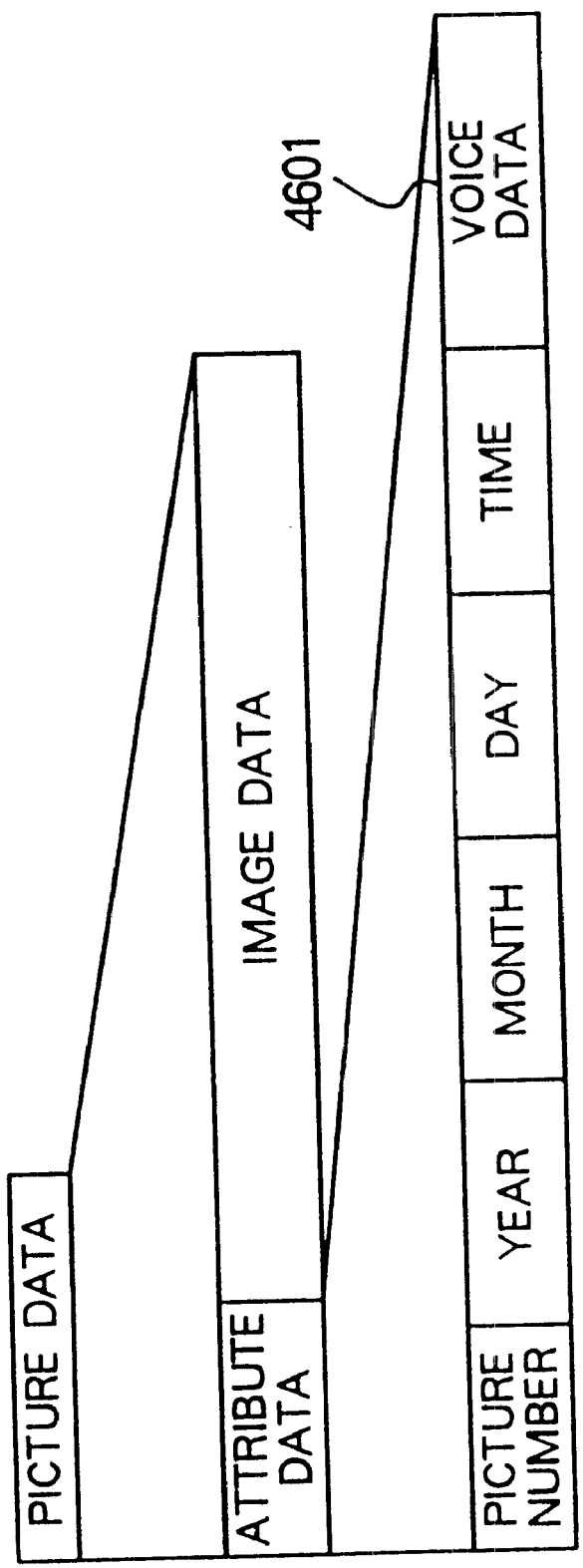
FIG. 46 is a structure of a picture data.

FIG. 46 shows a data structure of picture data in the eighth embodiment. The picture data has attribute data which contains voice data 4601.

FIG. 47 is a table showing an example of picture lists in an album list in the eighth embodiment. The other data other than a newly-added voice data column 4701 are substantially the same as those in the first embodiment. When the album list is generated, the system examines the presence of the voice data. In the case of the presence of the voice data, the system puts "1" in the voice data; whereas in the absence of the voice data, the system puts "0" in the voice data. When it is desired to display the album, the system examines the voice data column 4701 and can reproduce the voice of the picture having the voice data.

In this way, the first to eighth embodiments can be carried out respectively independently or in combination.

As has been explained in the foregoing, in accordance with the present invention, there can be provided an image recording/reproducing system which allows easy arrangement and keeping of picture images and also display of such picture images for appreciation. There is also provided an image recording/reproducing system which can minimize shooting miss of picture images.

What is claimed is:

1. A method for storing data of still picture images in a storage medium, comprising:
   inputting data of still picture images;
   providing each of the data of the still picture images thus inputted with a first identifier;
   classifying the data of the still picture images into a plurality to groups, each thereof including data of plural still picture images;
   providing data of the plural still picture images contained in a same group with a common second identifier;
   creating feature information indicative of a feature of data of each of the still picture images contained in each of said plurality of groups: and
   storing the data of said still picture images and said feature information in a storage medium, said feature information being stored so as to correspond to data of still picture images contained in each of said group thus classified, and further storing information for displaying the data of the still picture images on a display screen using said first identifier and said second identifier in a manner to have coresspondence relationships thereamong.

2. The method according to claim 1, wherein said feature information includes information concerning time of the data of the still picture images corresponding to said feature information.

3. The method according to claim 2, wherein said feature information includes shooting time of the data of the still picture images corresponding to said feature information.

4. The method according to claim 1, wherein said information for displaying the data of the still picture images on the display screen is an album style information which is created based on attribute information for data of each of the still picture images corresponding to said feature information so as to classifiable display ones of the still picture images contained in an associated group.

5. The method according to claim 1, wherein each of said groups is a unit for displaying data of a plurality of the still picture images contained in an associated group.

6. An apparatus for storing data of still picture images in a storage medium, comprising:
   an interface unit for inputting data of still picture images from an external source: and
   a storage controller coupled to said interface unit, to provide each of the data of the still picture images thus inputted with a first identifier, classify the data of the still picture images thus inputted into a plurality of groups each thereof including data of plural still picture images, provide data of the plural still picture images contained in a same group with a common second identifier, create feature information indicative of a feature of data of each of the still picture images contained in each of said plurality of groups, and store said data of the still picture images and said feature information in a storage medium, said feature information being stored so as to correspond to the data of still picture images contained in each of said groups thus classified, and further to store information to display the data of the still picture images on a display screen using said first identifier and said second identifier in a manner to have correspondence relationships thereamong.

7. The apparatus according to claim 6, wherein said feature information includes information concerning time of the data of the still picture images corresponding to said feature information.

8. The apparatus according to claim 7, wherein said feature information includes shooting time of the data of the still picture images corresponding to said feature information.

9. The apparatus according to claim 6, wherein said information for displaying the data of the still picture images on the display screen is an album style information which is created based on attribute information for data of each of the still picture images corresponding to said feature information so as to classifiably display ones of the still picture images contained in an associated group.

10. The apparatus according to claim 6, wherein each of said groups is a unit for displaying data of a plurality of the still picture images contained in an associated group.

11. An apparatus for outputting data of still picture images, comprising:

a unit for reading data of a plurality of still picture images contained in a group and feature information stored in said storage medium, where data of the still picture images have a first identifier, data of the plurality of still picture images contained in a same group have a common second identifier, said feature information indicative of a feature of data of each of the still picture images contained in said group, the unit further for reading information for outputting the data of the still picture images on a display screen using the first identifier and the second identifier in a manner to have correspondence relationships thereamong:

a unit for controlling a read operation of the data of still picture images by using said feature information; and a unit for outputting the data of said still picture images thus read.

12. The apparatus according to claim 11, wherein said feature information includes information concerning time of the data of the still picture images corresponding to said feature information.

13. The apparatus according to claim 12, wherein said feature information includes shooting time of the data of the still picture images corresponding to said feature information.

14. The apparatus according to claim 11, wherein said information for displaying the data of the still picture images on the display screen is an album style information which is created based on attribute information for data of each of the still picture images corresponding to said feature information so as to classifiably display still picture images contained in an associated group.

15. The apparatus according to claim 11, wherein said unit for outputting the data is a display for classifiable displaying the data of said still picture images contained in said group.

16. The apparatus according to claim 11, wherein each of said groups is a unit for displaying data of a plurality of the still picture images contained in an associated group.

17. A storage medium storing data of still picture images, comprising:

a first storage area storing data at still picture images, where data of the still picture images have a first identifier, data of the plurality of still picture images contained in a same group have a common second identifier;

a second storage area storing feature information indicative of a feature concerning time of data of a plurality of still picture images contained in an associated group for each of groups formed to classify the data of said still picture images; and a third storage area storing reading information for outputting the data of the still picture images on a display screen using the first identifier and the second identifier in a manner to have corespondence relationships thereamong, wherein an information processing apparatus to be coupled to said storage medium outputs the data of said still picture images by using said feature information.

18. The storage medium according to claim 17, wherein said feature concerning time is shooting time of data of associated still picture images.

19. The storage medium according to claim 18, wherein each of said groups is a unit for displaying data of a plurality of still picture images contained in an associated group.

* * * * *